US009270200B2

(12) United States Patent
Roscoe et al.

(10) Patent No.: US 9,270,200 B2
(45) Date of Patent: Feb. 23, 2016

(54) METHOD OF CONTROLLING AN INVERTER AND A CONTROLLER FOR CONTROLLING AN INVERTER

(75) Inventors: Andrew Jeremy Roscoe, Glasgow (GB); Stephen Jon Finney, Motherwell (GB)

(73) Assignee: ROLLS-ROYCE PLC, London (GB)

(*) Notice: Subject to any disclaimer, the term of this patent is extended or adjusted under 35 U.S.C. 154(b) by 108 days.

(21) Appl. No.: 13/591,746

(22) Filed: Aug. 22, 2012

(65) Prior Publication Data

US 2013/0051103 A1 Feb. 28, 2013

(30) Foreign Application Priority Data

Aug. 30, 2011 (GB) .................................... 1114868.1

(51) Int. Cl.
*H02M 7/5387* (2007.01)
*H02M 1/32* (2007.01)

(52) U.S. Cl.
CPC .... *H02M 7/53871* (2013.01); *H02M 2001/325* (2013.01)

(58) Field of Classification Search
CPC ............... H02M 2001/007; H02M 2001/0032; H02M 3/33507; H02M 3/33523; H02M 3/3376; H02M 1/32; H02M 7/48; H02M 7/53871; H02M 7/5387; H02M 7/53875
USPC ................ 363/95, 97, 98, 131, 132; 700/298; 307/77
See application file for complete search history.

(56) References Cited

U.S. PATENT DOCUMENTS

| 4,626,979 | A | | 12/1986 | Jaquay | |
|---|---|---|---|---|---|
| 5,148,362 | A | * | 9/1992 | Braun | H02J 3/26 363/37 |
| 6,239,997 | B1 | | 5/2001 | Deng | |
| 6,301,136 | B1 | * | 10/2001 | Huggett et al. | 363/95 |
| 7,760,526 | B2 | * | 7/2010 | Marroni et al. | 363/95 |
| 7,869,232 | B2 | * | 1/2011 | Nagata et al. | 363/37 |
| 8,339,094 | B2 | * | 12/2012 | Perisic et al. | 318/810 |
| 2003/0016001 | A1 | * | 1/2003 | Borup | H02J 3/18 323/364 |
| 2006/0198166 | A1 | | 9/2006 | Hirono et al. | |
| 2011/0103110 | A1 | * | 5/2011 | Godridge et al. | 363/74 |
| 2011/0170323 | A1 | * | 7/2011 | Fulcher et al. | 363/65 |
| 2011/0245990 | A1 | * | 10/2011 | Rasmussen | 700/298 |
| 2011/0286253 | A1 | * | 11/2011 | Rexilius | H02M 7/48 363/132 |
| 2012/0281444 | A1 | * | 11/2012 | Dent | 363/56.01 |
| 2013/0043816 | A1 | * | 2/2013 | Welchko et al. | 318/400.21 |
| 2013/0094258 | A1 | * | 4/2013 | Royak et al. | 363/89 |

OTHER PUBLICATIONS

Search Report issued in British Application No. 1114868.1 dated Jan. 30, 2012.

* cited by examiner

*Primary Examiner* — Gary L Laxton
*Assistant Examiner* — Kevin H Sprenger
(74) *Attorney, Agent, or Firm* — Oliff PLC

(57) ABSTRACT

A method of controlling an inverter for converting a DC input to an AC output, the method including measuring a voltage of an AC output produced by the inverter; determining a drive voltage for controlling the inverter; and if a difference in amplitude and/or phase between the drive voltage and the measured voltage exceeds a predetermined threshold, modifying the drive voltage to reduce the difference in amplitude and/or phase between the drive voltage and the measured voltage. The method may be particularly useful for controlling an inverter during "islanded" operation with a variable load, and may therefore be useful e.g. in marine, battlefield, disaster relief and/or aviation electrical power systems.

20 Claims, 11 Drawing Sheets

METHOD OF CONTROLLING AN INVERTER AND A CONTROLLER FOR CONTROLLING AN INVERTER

FIELD OF THE INVENTION

The present invention relates to a method of controlling an inverter for converting a DC input to an AC output and a controller for controlling an inverter to convert a DC input to an AC output. The AC output may be a three-phase AC output, for example.

BACKGROUND OF THE INVENTION

Most inverter-connected generation is designed to work in "grid-connected" mode. This means that it treats the PCC (point of common coupling) as a reasonably stiff voltage source (e.g. such that an impedance between the PCC and the transmission network is small compared to a per-unit inverter impedance, and such that the transmission network can be treated as an infinite bus). In this mode, the inverter switching bridge can generally be controlled so that it produces controlled currents which result in controllable active and reactive power exports [1]. To control the currents with adequate fidelity to avoid damage to switches during faults generally requires high-bandwidth inner current loops with bandwidths of at least 1000 rad/s (at least 160 Hz) [2] for 50 Hz systems.

An inner current loop can be viewed as controlling an inverter based on a nominal output current, e.g. which take the form of "ideal" ("target" or "reference") currents, and usually involves the use of current limits so as to avoid the currents produced by the inverter from becoming too high. Current limits are generally easy to employ, since the reference currents can be clipped to levels safely below those which would cause damage to the solid-state inverter components.

To use such inner current loops, the target currents (the current references) generally need to be determined by mathematical methods or by outer control loops. This process is relatively easy during normal grid-connected operation, and there are multiple references to this (for example, [1], [3], [4]).

For inverters using inner current loops, it is not always obvious what the reference currents should be. This is particularly true in islanded or small power system operation when loads may be unbalanced or contain harmonic components, or during fault scenarios.

For example, in islanded scenarios, the required currents are determined by the connected loads (or other generators). If a new load is switched on, the currents must generally change to meet that new load. The loads may be unbalanced, and may even be single-phase loads. The loads may draw harmonic currents. Such issues have traditionally been addressed for UPS (Uninterruptible Power Supplies) by the use of "deadbeat" or similar controllers which determine the currents required to produce clean, balanced sinusoidal voltages at the UPS output terminals, at the target voltage magnitude and frequency. For example [5] [6]. Such schemes are established for the control of single inverter feeding a small power network. The schemes do not generally extend well to the use of multiple parallel inverters feeding the same network, due to the multiple controllers attempting to force frequency and voltage at closely coupled points of common coupling (PCC) (described in [7]). Parallel operation of such inverters generally requires high switching frequencies and also dedicated high-bandwidth communications between inverters. High switching frequencies are generally required since the switching frequency can limit the bandwidth of the inner current loop, which in turn can place limits on the bandwidths of any outer control loops which determine the current references.

For inverters of significant size (100 kW or more), switching speed is limited due to the acceptable switching losses. Switching frequencies of 1.5-4 kHz are typical. These switching frequencies generally preclude the use of dual nested current and voltage control loops, since the bandwidth of the voltage control loop will not be high enough to control the actual voltages to meet the balanced sinusoidal targets, leading to poor voltage power quality. In particular, if a load is added or removed, the finite control response time will result in voltage transients on the network, as the inverter transiently outputs currents which are incorrect to match the demand.

An alternative, in islanded scenarios, is the use of lower switching frequencies and lower bandwidth inner current loops, coupled to a voltage control loop, including droop controls which allows multiple inverters to be used in parallel, without high bandwidth communications. This is described in [7]. It requires the use of accurate state-space models of the filter inverter network, and Kalman filters to predict the response [8]. Although promising, this method has not yet been demonstrated in the public domain beyond simple use cases (i.e. balanced, sinusoidal, non-fault conditions).

During fault scenarios, the determination of the "ideal" currents to source can also be problematic. The emerging grid codes for renewable power sources and large inverters (or amalgamations of many small inverters) generally state that "maximum reactive power" should be exported by the inverter during a voltage dip (fault) [9] [10] [11] [12]. For three-phase faults, the reference currents can usually be determined relatively easily. For unbalanced faults, or faults containing transients or harmonics, it is often not clear what the ideal reference current should be, without intimate knowledge of the fault impedances. Thus, for example, a grid-code compliant response is shown in [4] for an unbalanced fault, by sourcing balanced currents, while [13] compares three control schemes which produce different balanced and unbalanced currents in response to the same fault conditions. While generally acceptable when connected to large "stiff" grids, such fault response would be highly undesirable within a power system which is not so stiff, or which contains a high proportion of inverter-connected sources with such a response. This is because the balanced "reactive" currents sourced into an unbalanced fault may result in significant voltage unbalance, possibly including overvoltage on unfaulted phases.

The conventional response of generating plant within power systems is provided by large synchronous generators. During faults, these generally behave as a balanced, sinusoidal voltage source, with a high rotational inertia, connected to the PCC via a transient inductance [14], which is typically in the region of 5-15% of the per-unit impedance of the machine. This generally gives rise to currents in the region of 6-20 times the rated values of the machine, for the duration of the fault. This may be acceptable for a wound machine for short periods of time, e.g. causing temperature rise in the windings but not permanent damage. The response of such machines is normally to continue sourcing balanced sinusoidal voltages. The currents which flow are generally determined by the fault impedances (balanced or unbalanced) and the network topology. Note that the action of the machine is generally always to tend to restore the voltages at the PCC to the balanced 1 pu sinusoidal case, and the rotational inertia tends to stabilise the frequency. The voltages at the PCC will generally not be held exactly to the balanced 1 pu sinusoidal condition, due to the finite value of the machine transient reactance. This reactance can also limit the currents which flow, to allowable levels (the "fault level").

Such response is highly desirable from inverters, during faults. However, in general this is not economically possible since the solid-state switching devices within the inverter may be damaged if any peak current greater than, for example, 2 pu (per-unit) flows for even a single part of a cycle. This is because allowing higher values of overcurrent require more expensive switch devices, or multiple switch devices in parallel.

In general terms, the inventor has found inner current loops to work well during "grid-connected" operation, but less well during "islanded" operation, especially if a fault develops.

None of the known methods for providing islanded or fault ride-through operation of inverters allows the use of an inner voltage (rather than inner current) control loop to provide a synchronous generator type response, while also providing overcurrent protection for the inverter devices, and also allowing the inverter to continue operation to ride-through the fault. An inner voltage loop can be viewed as controlling an inverter based on a nominal output voltage, e.g. a balanced three-phase voltage of nominal amplitude at 50 Hz.

The present invention has been devised in light of the above considerations.

SUMMARY OF THE INVENTION

In general, the invention relates to a method of controlling an inverter in which a drive voltage (for controlling the inverter) is modified to reduce a difference in amplitude and/or phase between the drive voltage and a measured voltage of an AC output produced by the inverter, if the difference is (or becomes) too large.

A first aspect of the invention may therefore provide a method of controlling an inverter for converting a DC input to an AC output, the method including:

measuring a voltage of an AC output produced by the inverter;

determining a drive voltage for controlling the inverter; and if a difference in amplitude and/or phase between the drive voltage and the measured voltage exceeds a predetermined threshold, modifying the drive voltage to reduce the difference in amplitude and/or phase between the drive voltage and the measured voltage.

By controlling an inverter based on a drive voltage (which may be characterised as use of an "inner voltage loop"), the inventor has found that the inverter is able to work effectively during "islanded" operation as well as during "grid-connected" operation. By reducing a difference in amplitude and/or phase between a drive voltage and a measured voltage if a predetermined threshold is exceeded, the inventor has found that the inverter is able to avoid large overcurrents during "islanded" operation (as well as during "grid-connected" operation), even if a serious fault develops.

The method may be particularly useful for controlling an inverter during "islanded" operation with a variable load, and may therefore be useful e.g. in marine, battlefield, disaster-relief and/or aviation electrical power systems. The method may also be useful for creating simple "generic" behavioural black-box inverter models using voltage-sources (i.e. not modeling high-bandwidth control loops, switching devices or PWM waveforms). This may be useful, since it may lead to simpler models which can be replicated many times within power system simulations with acceptable memory requirements and execution times.

The method may have any one or, to the extent that they are compatible, any combination of optional features that will now be set out. These are applicable singly or in any combination with any aspect of the invention. Thus, the invention also includes any combination of the aspects and preferred features described.

The drive voltage may be for controlling the inverter to produce an AC output based on the drive voltage. The drive voltage may be produced, for example, based on a measured voltage and/or current of an AC output produced by the inverter. For the avoidance of any doubt, the drive voltage may be a theoretical voltage, e.g. represented by a value or set of values that is/are used to control the inverter, but not actually produced as a voltage during the method. In this sense, the drive voltage can be viewed as a "nominal" or "target" drive voltage. Control schemes which use a drive voltage are known in the art.

Preferably, the drive voltage is for controlling the inverter indirectly, e.g. with the controller producing switching signals (e.g. pulse width modulated signals) for controlling one or more switches of the inverter based on the drive voltage, e.g. switching signals for controlling one or more switches of the inverter to produce an output voltage based on the drive voltage. For the avoidance of any doubt, the drive voltage could be a multi-phase drive voltage and the output voltage could be a multi-phase output voltage (see below for an explanation of multi-phase voltages), e.g. with the controller producing switching signals (e.g. pulse width modulated signals) for controlling one or more switches of the inverter based on the multi-phase drive voltage, e.g. switching signals for controlling one or more switches of the inverter to produce a multi-phase output voltage based on the multi-phase drive voltage.

By way of example, an (e.g. multi-phase) output voltage produced by the one or more switches could have a rectangular waveform with a duty cycle that is based on (e.g. a phase of) the (e.g. multi-phase) drive voltage. In a multi-phase case, each phase of a multi-phase output voltage produced by the one or more switches could have a respective rectangular waveform with a duty cycle based on a respective phase of a multi-phase drive voltage.

By way of example, an (e.g. multi-phase) output voltage produced by the one or more switches could have a waveform (e.g. a rectangular waveform) that corresponds to, e.g. has an average voltage that is approximately equal to, substantially equal to or approximately linearly proportional to, (e.g. a phase of) the (e.g. multi-phase) drive voltage. In a multi-phase case, each phase of the multi-phase output voltage produced by the one or more switches could have a respective waveform that corresponds to, e.g. has an average voltage that is approximately equal to, substantially equal to or approximately linearly proportional to, a respective phase of a multi-phase drive voltage.

In this context, "approximately equal" preferably means equal to the extent that there is a percentage difference (or "error") of no more than 10%, for example. Preferably, the percentage difference is much less than 10%, and would typically be set by parameters such as required dead-times in switching, finite switching times for on/off and off/on transitions and (typically non-linear) semiconductor component losses. Also, the actual output voltage(s) are also typically affected by a DC bus voltage, which generally varies with time. The DC bus voltage are preferably measured and taken into account in determining e.g. PWM duty cycles required for the output voltage produced by the one or more switches to correspond to the drive voltage.

In this context, "approximately linearly proportional to" accounts for the possibility of the output voltage produced by the one or more switches being affected by a DC bus voltage (which, as noted above, will generally vary with time), the switching properties of the switches, any dead-times between switching transitions, and any linear or non-linear losses due to switch component properties. These effects are preferably taken into account, e.g. in determining PWM duty cycles required for the output voltage produced by the one or more switches to correspond to the drive voltage, e.g. so as to minimise errors.

For the avoidance of any doubt, the "predetermined threshold" need not be a fixed value. For example, the threshold may be dependent on one or more parameters that may vary over time. Therefore, the "predetermined threshold" could take the form of a threshold that varies over time, e.g. as determined by one or more pre-defined conditions, rather than being limited to a fixed value.

For the avoidance of any doubt, the "predetermined threshold" could be one of a plurality of predetermined thresholds, e.g. with the method including modifying the drive voltage to reduce the difference in amplitude and/or phase between the drive voltage and the measured voltage if a difference in amplitude and/or phase between the drive voltage and the measured voltage exceeds any one of a plurality of predetermined thresholds. For example, if the measured voltage and the drive voltage are multi-phase voltages (see below), then there could be a respective predetermined threshold (and/or multiple predetermined thresholds) for each phase of the multi-phase voltage.

Preferably, the measured voltage is converted into a "measured voltage" vector representative of the measured voltage in a reference frame, preferably a two-dimensional reference frame. Preferably, the drive voltage is provided as a "drive voltage" vector representative of the drive voltage in the (preferably two-dimensional) reference frame. Preferably, the difference in amplitude and/or phase between the drive voltage and the measured voltage is a difference between the drive voltage vector and the measured voltage vector in the (preferably two-dimensional) reference frame, e.g. such that the method includes, if a difference between the drive voltage vector and the measured voltage vector in the (preferably two-dimensional) reference frame exceeds a pre-determined threshold, modifying the drive voltage vector to reduce the difference between the drive voltage vector and the measured voltage vector in the (preferably two-dimensional) reference frame.

Accordingly, the first aspect of the invention may provide a method including:

measuring a voltage of an AC output produced by the inverter, wherein the measured voltage is converted into a measured voltage vector representative of the measured voltage in a (preferably two-dimensional) reference frame;

determining a drive voltage for controlling the inverter, wherein the drive voltage is provided as a drive voltage vector representative of the drive voltage in the (preferably two-dimensional) reference frame; and if a difference between the drive voltage vector and the measured voltage vector in the (preferably two-dimensional) reference frame exceeds a predetermined threshold, modifying the drive voltage vector to reduce the difference between the drive voltage vector and the measured voltage vector in the (preferably two-dimensional) reference frame.

For the avoidance of any doubt, the drive voltage vector could be provided by converting an initially determined drive voltage into the drive voltage vector, or by producing the drive voltage in the form of the drive voltage vector in the first place.

Use of a (preferably two-dimensional) reference frame can be a particularly convenient way of representing the amplitude and/or phase of voltages, particularly multi-phase voltages, and may therefore provide a particularly convenient way of determining a difference in amplitude and/or phase between the drive voltage and the measured voltage, particularly if the drive voltage and measured voltage are multi-phase voltages (see below). Although use of a two-dimensional reference frame is preferred, other reference frames, e.g. a three-dimensional reference frame, may also be used, as explained below.

Preferably, the (e.g. two-dimensional) reference frame is constructed such that a vector in the (preferably two-dimensional) reference frame provides information about the phase and amplitude of a voltage or current, e.g. such that a difference between a drive voltage vector and a measured voltage vector in the (preferably two-dimensional) reference frame is representative of a difference in amplitude and/or phase between a drive voltage (represented by the drive voltage vector) and a measured voltage (represented by the measured voltage vector).

The (preferably two-dimensional) reference frame may be a stationary or a rotating (or "synchronous") reference frame. An example of a stationary reference frame in which a vector provides information about the phase and amplitude of a voltage or current is the "αβ" (or "Clarke's") frame, into which a voltage and/or current can be converted using the "Clarke" transformation. An example of a rotating reference frame in which a vector provides information about the phase and amplitude of a voltage or current is the "dq" (or "Park's") frame, into which a voltage and/or current can be converted using the "Park" transformation.

The inverter may be for converting a DC input to a multi-phase AC output. For example, the method may include measuring a multi-phase voltage of an AC output produced by the inverter. Similarly, the method may include determining a multi-phase drive voltage for controlling the inverter. Similarly, the difference in amplitude and/or phase between the drive voltage and the measured voltage may be a difference in amplitude and/or phase between a multi-phase drive voltage and a multi-phase measured voltage, e.g. such that the method includes, if a difference in amplitude and/or phase between a multi-phase drive voltage and a multi-phase measured voltage exceeds a pre-determined threshold, modifying the multi-phase drive voltage to reduce the difference in amplitude and/or phase between the multi-phase drive voltage and a multi-phase measured voltage.

A "multi-phase voltage" can be viewed as describing multiple voltages, typically having a well defined (e.g. substantially fixed) phase relationship, with each voltage belonging to a respective "phase" of the multi-phase voltage. For example, a multi-phase drive voltage can be viewed as describing multiple drive voltages, with each drive voltage belonging to a respective "phase" of the multi-phase drive voltage. Similarly, a multi-phase measured voltage can be viewed as describing multiple measured voltages, with each measured voltage belonging to a respective "phase" of the multi-phase measured voltage. Accordingly, measuring a multi-phase voltage of a multi-phase AC output produced by the inverter may therefore include measuring a respective voltage of each phase of the multi-phase AC output, e.g. by measuring each line to neutral voltage for a 4-wire three-phase inverter or by measuring each line-line voltage for a 3-wire three-phase inverter.

A common example of a multi-phase voltage is a "three-phase voltage" which can be viewed as describing three voltages, typically having a well-defined phase relationship (e.g. with each voltage being phase shifted from the others by a third of a cycle or $2\pi/3$ radians), with each voltage belonging to a respective "phase" of the three-phase voltage.

Preferably, the method includes:

measuring a current of an AC output produced by the inverter; and if the measured current exceeds a predetermined threshold, modifying the drive voltage to reduce the current of the AC output produced by the inverter.

This "overcurrent limiting", especially when used in conjunction with the method of controlling an inverter already described, may be particularly effective in reducing overcurrents without producing the "harsh" waveforms that can be produced when using overcurrent limiting alone (see e.g. FIGS. 4a-c, discussed below). For simplicity, in this overcurrent limiting, the drive voltage is preferably not provided as a vector in the (preferably two-dimensional) reference frame, e.g. because it has been converted back to its original form (e.g. a single or multi-phase voltage).

For the avoidance of any doubt, the measured current, AC output and/or drive voltage for the current limiting may respectively be a multi-phase measured current, a multi-phase AC output and a multi-phase drive voltage.

For the avoidance of any doubt, the "predetermined threshold" for the "overcurrent limiting" need not be a fixed value and could be one of a plurality of predetermined thresholds. For example, if the measured current is a multi-phase measured current, then there may be a respective threshold for each "phase" of the multi-phase measured current, and a multi-phase drive voltage may be modified according to which "phase" of the multi-phase measured current has exceeded its respective threshold.

Preferably, the method includes controlling the inverter based on the drive voltage, e.g. so as to produce an AC output based on the drive voltage. The method may include controlling the inverter based on the drive voltage by producing switching signals (e.g. pulse width modulated signals) for controlling one or more switches of the inverter based on the drive voltage, e.g. switching signals for controlling one or more switches of the inverter to produce an output voltage based on the drive voltage, e.g. as described above. For the avoidance of any doubt, the drive voltage could be a multi-phase drive voltage and the output voltage could be a multi-phase output voltage, e.g. as described above. The one or more switches may include one or more solid-state switches and/or may be included in a switching bridge, as is known in the art.

The step of controlling the inverter based on the drive voltage preferably occurs after a step of, if a difference in amplitude and/or phase between the drive voltage and the measured voltage exceeds a predetermined threshold, modifying the drive voltage to reduce the difference in amplitude and/or phase between the drive voltage and the measured voltage, and/or preferably occurs after a step of, if a measured current exceeds a predetermined threshold, modifying the drive voltage to reduce the current of the AC output produced by the inverter. Thus, the drive voltage used to control the inverter may have been modified to reduce the difference in amplitude and/or phase between the drive voltage and the measured voltage modified or reduced as described above. Similarly, the drive voltage used to control the inverter may have been modified to reduce the current of the AC output produced by the inverter as described above.

One or more steps as described above may be included in a control frame (or "switching frame"), with the method including repeating the control frame, e.g. at regular intervals, e.g. at a frequency of 1.5-4 kHz. For example, each control frame, a new voltage of an AC output produced by the inverter may be measured, a new drive voltage for controlling the inverter may be determined (and modified if a difference in amplitude and/or phase between the drive voltage and the measured voltage exceeds a predetermined threshold), and the inverter may be controlled e.g. to produce an AC output based on the new drive voltage. Note that an AC output produced by the inverter based on a drive voltage each control frame may be only be a small portion of a complete AC cycle.

The method may be performed with the inverter connected to a grid ("grid-connected operation"), which may be a grid that can be treated as a "stiff" voltage source (e.g. such that an impedance between a point of common coupling between the inverter and the grid is small compared to a per-unit inverter impedance), or may be performed with the inverter not connected to a grid ("islanded operation").

The first aspect of the invention may provide any combination of the above features, e.g. a method of controlling an inverter for converting a DC input to an AC output, the method including:

measuring a multi-phase voltage of an AC output produced by the inverter, wherein the multi-phase measured voltage is converted into a measured voltage vector representative of the multi-phase measured voltage in a two-dimensional reference frame;

determining a multi-phase drive voltage for controlling the inverter, wherein the multi-phase drive voltage is provided as a drive voltage vector representative of the multi-phase drive voltage in the two-dimensional reference frame; and if a difference between the drive voltage vector and the measured voltage vector in the two-dimensional reference frame exceeds a predetermined threshold, modifying the drive voltage vector to reduce the difference between the drive voltage vector and the measured voltage vector in the two-dimensional reference frame.

Any aforementioned multi-phase voltage may be a three-phase voltage, for example.

A second aspect of the invention may provide a controller for controlling an inverter to convert a DC input to an AC output, the controller being configured to:

measure a voltage of an AC output produced by the inverter;

determine a drive voltage for controlling the inverter; and if a difference in amplitude and/or phase between the drive voltage and the measured voltage exceeds a predetermined threshold, modify the drive voltage to reduce the difference in amplitude and/or phase between the drive voltage and the measured voltage.

Thus the controller may be suitable for performing the method of the first aspect. Accordingly, the controller may have (or be configured to perform) any one or, to the is extent that they are compatible, any combination of the optional features corresponding to the optional features of the method of the first aspect. For example, the controller may have any one or, to the extent that they are compatible, any combination of the following optional features.

For example, the controller may be configured to convert the measured voltage into a "measured voltage" vector representative of the measured voltage in a (preferably two-dimensional) reference frame. For example, the controller may be configured to provide the drive voltage as a "drive voltage" vector representative of the drive voltage in the (preferably two-dimensional) reference frame. For example, the controller may be configured to, if a difference between the drive voltage vector and the measured voltage vector in the (preferably two-dimensional) reference frame exceeds a pre-determined threshold, modify the drive voltage vector to reduce the difference between the drive voltage vector and the measured voltage vector in the (preferably two-dimensional) reference frame.

For example, the controller may be for controlling an inverter to convert a DC input to a multi-phase AC output. Accordingly, the controller may be configured to measure a multi-phase voltage of an AC output produced by the inverter. Similarly, the controller may be configured to determine a multi-phase drive voltage for controlling the inverter. Similarly, the controller may be configured to, if a difference in amplitude and/or phase between a multi-phase drive voltage and a multi-phase measured voltage exceeds a pre-determined threshold, modify the multi-phase drive voltage to reduce the difference in amplitude and/or phase between the multi-phase drive voltage and a multi-phase measured voltage.

For example, the controller may be configured to:

measure a current of an AC output produced by the inverter; and if the measured current exceeds a predetermined threshold, modify the drive voltage to reduce the current of the AC output produced by the inverter. For example, the controller may be configured to control the inverter based on the drive voltage, e.g. so as to produce an AC output based on the drive voltage. The controller may be configured to control the inverter based on the drive voltage by producing switching signals (e.g. pulse width modulated signals) for controlling one or more switches of the inverter based on the drive voltage, e.g. switching signals for controlling one or more switches of the inverter to produce an output voltage based on the drive voltage, e.g. as described above. For the avoidance of any doubt, the drive voltage could be a multi-phase drive voltage and the output voltage could be a multi-phase output voltage, e.g. as described above.

For example, one or more steps as described above may be included in a control frame (or "switching frame"), with the controller being configured to repeat the control frame, e.g. at regular intervals, e.g. at a frequency of 1.5-4 kHz.

The controller may be included in an inverter for converting a DC input to an AC output.

Accordingly, the second aspect of the invention may provide an inverter for converting a DC input to an AC output, the inverter including a controller as described above, e.g. a controller configured to:

measure a voltage of an AC output produced by the inverter;

determine a drive voltage for controlling the inverter; and if a difference in amplitude and/or phase between the drive voltage and the measured voltage exceeds a predetermined threshold, modify the drive voltage to reduce the difference in amplitude and/or phase between the drive voltage and the measured voltage.

The inverter may have one or more switches. The controller may be configured to control the inverter based on the drive voltage, e.g. so as to produce and AC output based on the drive voltage. The controller may be configured to control the inverter based on the drive voltage by producing switching signals (e.g. pulse width modulated signals) for controlling the one or more switches of the inverter based on the drive voltage, e.g. switching signals for controlling the one or more switches of the inverter to produce an output voltage based on the drive voltage, e.g. as described above. For the avoidance of any doubt, the drive voltage could be a multi-phase drive voltage and the output voltage could be a multi-phase output voltage, e.g. as described above.

The inverter may have one or more filter components which may be configured to act to filter an output voltage produced by the one or more switches, e.g. to smooth an output voltage produced by the one or more switches, e.g. to produce a smoothed, e.g. sinusoidal, output voltage. For example, the smoothed output voltage could be a multi-phase (e.g. three-phase) smoothed output voltage. This may be appropriate if, for example, the output voltage produced by the one or more switches has a rectangular waveform, or multiple rectangular waveforms (e.g. with each phase of a multi-phase output voltage having a respective rectangular waveform), as described above.

Each operation performed by the controller may be performed by a respective component or means of the controller. For example, the controller may have a component configured to measure a voltage of an AC output produced by the inverter; a component configured to determine a drive voltage for controlling the inverter; and a is component configured to, if a difference in amplitude and/or phase between the drive voltage and the measured voltage exceeds a predetermined threshold, modify the drive voltage to reduce the difference in amplitude and/or phase between the drive voltage and the measured voltage.

For the avoidance of any doubt, each component of the controller may respectively be implemented in software (e.g. as software code) and/or hardware (e.g. as physical circuitry).

A third aspect of the invention may provide a computer-readable medium having computer-executable instructions configured to cause a controller of an inverter to perform a method according to the first aspect of the invention.

The invention also includes any combination of the aspects and preferred features described except where such a combination is clearly impermissible or expressly avoided.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

In general, the following discussion describes examples of these proposals that relate to a method controlling an inverter in which a drive voltage (for controlling the inverter) is modified to reduce a difference in amplitude and/or phase between the drive voltage and a measured voltage of an AC output produced by the inverter, if the difference is (or becomes) too large.

In the specific examples described below, the modification is performed in a stationary (e.g. "αβ") or rotating (e.g. "dq") two-dimensional reference frame, and can therefore be characterised as "a limiting method in a stationary or rotating two-dimensional reference frame".

The described method may allow use of an inner voltage control loop instead of an inner current control loop.

The inventor has found that the described method may provide islanded or fault ride-through operation with a synchronous generator type response, whilst also providing overcurrent protection for the inverter devices, and also allowing the inverter to continue operation to ride-through a fault.

Preferably, the described method involves the use of low-bandwidth inner voltage loop(s), preferably such that the frequency and voltage (or power angle and voltage in grid-connected mode) are controlled, rather than the currents. This can allow good power sharing between multiple inverters, and allows islanded/small power system operation. It also can allow good network support during faults, since the control preferably tends to mimic the response of a synchronous generator. The inventor has found that if the drive voltage is not modified to reduce a difference in amplitude and/or phase between the drive voltage and the measured voltage if the difference is too large, then the inverter may be at risk of over-currents during faults or overloads.

The described method preferably allows a low-bandwidth voltage control loop to function unimpeded most of the time, providing good power quality. However, when there is a high risk of overcurrent, the described method preferably acts to clip the drive voltages, preferably in a two-dimensional frame, preferably so as to significantly reduce overcurrents in switching devices of the inverter, preferably while still attempting to provide the best possible voltage support. Some additional supporting methods are also described, which preferably work in tandem with a limiting method in a stationary or rotating two-dimensional frame To implement the invention, a method of controlling an inverter may be embedded within an inverter control algorithm, which may be based on an inner voltage control loop. Use of an inner voltage control loop in this context is thought to be unconventional, and is therefore described for context.

Within the following descriptions, all voltages, currents, and component values are in per-unit (pu).

Figure 1:
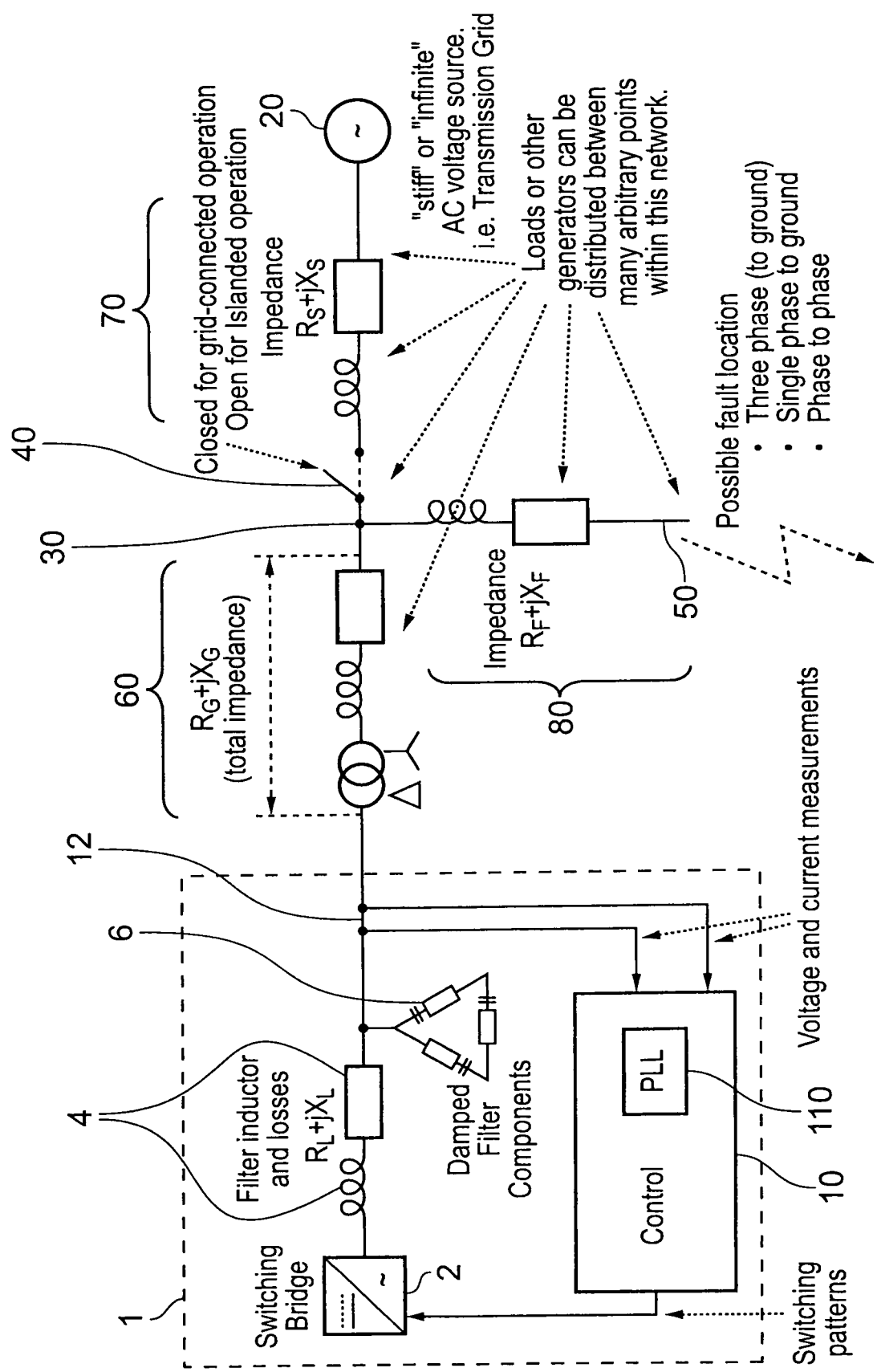
FIG. 1 is a generalised diagram of a three-phase inverter installed in a power distribution network, under potential fault conditions.

FIG. 1 is a generalised diagram of an inverter 1 installed in a power distribution network, under potential fault conditions.

The inverter 1 is preferably a three-phase inverter for converting a DC input into a three-phase AC output. The inverter 1 preferably has one or more switches, one or more filter components 4, 6 and a controller 10 for controlling the inverter 1 to convert a DC input to a three-phase AC output.

The one or more switches may include one or more solid-state switches and/or may be included in a switching bridge 2, as is known in the art.

The one or more filter components 4, 6 preferably include an inductive filter 4 and damped filter components 6. An impedance associated with the filter components 4, 6 is shown in FIG. 1 as $R_L+jX_L$.

The controller 10 is preferably configured to control the inverter 1 based on a three-phase drive voltage, which is described in more detail below, e.g. so as to produce a three-phase AC output based on the three-phase drive voltage. The controller 10 is preferably configured to control the inverter 1 based on the three-phase drive voltage by producing switching signals (e.g. pulse width modulated signals) for controlling the one or more switches of the inverter 1 to produce a three-phase output voltage based on the three-phase drive voltage.

By way of example, each phase of a three-phase output voltage produced by the one or more switches could have a respective rectangular waveform with a duty cycle that is based on a respective phase of the three-phase drive voltage, e.g. with each rectangular waveform corresponding to, e.g. having an average voltage that is approximately equal to, substantially equal to or approximately linearly proportional to, a respective phase of the three-phase drive voltage.

The one or more filter components 4, 6 may be configured to act to filter a three-phase output voltage produced by the one or more switches, e.g. to smooth a three-phase output voltage produced by the one or more switches, e.g. to produce a smoothed, e.g. sinusoidal, three-phase output voltage. This may be appropriate if, for example, the three-phase output voltage produced by the one or more switches has multiple rectangular waveforms, e.g. with each phase having a respective rectangular waveform as described above.

The inverter 1 is shown in FIG. 1 as being optionally coupled to a transmission grid 20 at a point of common coupling (PCC) 30. A switch 40 determines whether the inverter 1 is coupled to the grid ("grid-connected operation") or is not coupled to the grid ("islanded operation"), according to whether the switch 40 is closed or open.

A possible fault 50 is also shown in FIG. 1. The fault 50 could, for example, be a three-phase (to ground) fault, a two-phase (phase-to-phase) fault, or a single phase (to ground) fault, for example.

Various loads and/or generators may be distributed at arbitrary points within the power distribution network of FIG. 1, which here has been simplified to the impedances 60, 70, 80 each having a respective impedance $R_G+jX_G$, $R_S+jX_S$, $R_F+jX_F$.

The controller 10 is preferably configured to measure a three-phase voltage $V_{abc}=V_a, V_b, V_c$ (e.g. by measuring each line to neutral voltage for a 4-wire inverter, or each line-line voltage for a 3-wire inverter) and a three phase current $I_{abc}=I_a, I_b, I_c$ of an AC output produced by the inverter 1, e.g. at three output lines of the inverter 1. Other measurements may also be made. The controller 10 may include a phased-locked-loop (PLL) 110 that may be used to track the three-phase measured voltage $V_{abc}$.

The three-phase measured voltage $V_{abc}$ and measured three-phase current $I_{abc}$ can be converted (or "transformed") to a respective vector in a two-dimensional (or "2-axis") reference frame, e.g. by the Park transformation component 115 shown in FIGS. 2a-d (described below). This can be done either by using a stationary reference frame transformation to transform the voltages and/or currents to a stationary reference frame or a rotating reference frame transformation to transform the voltages and/or currents to a rotating reference frame (sometimes called a "synchronous" reference frame). An example of a stationary reference frame transformation is the Clarke transformation (sometimes called an "αβ" or "αβγ" transformation), which can be used to transform a voltage or current to the "αβ" (or "Clarke's") frame. An example of a rotating reference frame transformation is the Park transformation (sometimes called a "dq" transformation), which can be used to transform a voltage or current to the "dq" (or "Park's") frame.

An example of the Clarke transformation (for the positive sequence) as applied to a three-phase measured voltage $V_{abc} = V_a, V_b, V_c$ is:

$$\begin{bmatrix} \alpha \\ \beta \\ \gamma \end{bmatrix} = \frac{2}{3} \begin{bmatrix} 1 & -\frac{1}{2} & -\frac{1}{2} \\ 0 & +\frac{\sqrt{3}}{2} & -\frac{\sqrt{3}}{2} \\ \frac{1}{2} & \frac{1}{2} & \frac{1}{2} \end{bmatrix} \times \begin{bmatrix} V_a \\ V_b \\ V_c \end{bmatrix} \quad (1)$$

$$V_{\alpha\beta}^p = (\alpha + \beta j) = \frac{2}{3} \left[ V_a + e^{j\frac{2\pi}{3}} V_b + e^{-j\frac{2\pi}{3}} V_c \right] \quad (2)$$

where $V_{\alpha\beta}^p$ is a "measured voltage" vector representative of the three-phase measured voltage $V_{abc}$ in the "αβ" frame (superscript p indicates positive sequence), and α, β, γ are the components of the three-phase voltage after the Clarke transformation has been applied. Note that so as to arrive at a vector in a two-dimensional reference frame, the γ component of the transformed three-phase voltage is not used. This γ component is the "zero sequence" component of the transformed three-phase voltage.

The Park transformation has several variants, any of which can be made to work, so long as consistency is maintained. An example of the Park transformation (for the positive sequence) as applied to a three-phase measured voltage $V_{abc} = V_a, V_b, V_c$ is:

$$\begin{bmatrix} V_d^{rp} \\ V_q^{rp} \\ V_0 \end{bmatrix} = \frac{2}{3} \begin{bmatrix} \sin(\theta) & \sin\left(\theta - \frac{2\pi}{3}\right) & \sin\left(\theta + \frac{2\pi}{3}\right) \\ \cos(\theta) & \cos\left(\theta - \frac{2\pi}{3}\right) & \cos\left(\theta + \frac{2\pi}{3}\right) \\ \frac{1}{2} & \frac{1}{2} & \frac{1}{2} \end{bmatrix} \times \begin{bmatrix} V_a \\ V_b \\ V_c \end{bmatrix} \quad (3)$$

$$V_{dq}^p = (V_d^{rp} + V_q^{rp} j) = \frac{2}{3} \left[ e^{j(\frac{\pi}{2}-\theta)} V_a + e^{j(\frac{\pi}{2}-\theta+\frac{2\pi}{3})} V_b + e^{j(\frac{\pi}{2}-\theta-\frac{2\pi}{3})} V_c \right] \quad (4)$$

$$V_{dq}^p = (V_d^{rp} + V_q^{rp} j) = \frac{2}{3} j e^{-j\theta} \left[ V_a + e^{j\frac{2\pi}{3}} V_b + e^{-j\frac{2\pi}{3}} V_c \right] \quad (5)$$

where $V_{dq}^p$ is a "measured voltage" vector representative of the three-phase measured voltage $V_{abc}$ in the "dq" frame (superscript p indicates positive sequence), and $V_d^{rp}, V_q^{rp}, V_0$ are the components of the three-phase voltage after the Park transformation has been applied. Note that so as to arrive at a vector in a two-dimensional reference frame, the $V_0$ component of the transformed three-phase voltage is not used. This $V_0$ component is the "zero sequence" component of the transformed three-phase voltage.

The Park transformations are related to the Clarke transformations, and the Park transformations can be made equivalent to the Clarke transformations by setting θ to 0 and applying basic rotations or reflections (conjugations).

Equations (1) to (5) refer to a three-phase measured voltage $V_{abc}$, but can be applied in exactly the same way to a measured three-phase current $I_{abc}$. Inverse transformations also exist, and can be used to convert vectors in a stationary or rotating two-dimensional reference frame to 3-phase quantities where necessary.

In 3-wire inverters, there is by definition no zero sequence. In 4-wire inverters, there may be finite zero sequence quantities.

Note that a two-dimensional reference frame can be used with multi-phase voltages other than three-phase voltages, using an appropriate transformation. For example, a two-dimensional reference frame could be used with a seven-phase voltage.

Referring back to FIG. 1, the three-phase measured voltage $V_{abc}$, e.g. which may be measured at the damped filter components 6, may be transformed to a stationary or rotating ("synchronous") two-dimensional reference frame, and passed to the PLL 110. The PLL 110 may provide the value θ which is used in (3) to define the rotating two-dimensional reference frame (if used), and also to provide a measure of the frequency f.

The measured voltage vector $V_{\alpha\beta}^p$ or $V_{dq}^p$ is preferably evaluated, e.g. according to equation (1) or (3), every discrete control frame (control frames are discussed in more detail below), and as such may represent an "instantaneous", e.g. unfiltered and/or unaveraged, voltage. The measured voltage vector $V_{\alpha\beta}^p$ or $V_{dq}^p$ may consist of a "steady-state" value which represents the positive-sequence fundamental voltage components, plus oscillating harmonic terms which represent any negative sequence, DC ($0^{th}$ harmonic), or higher-order harmonic components [1] [15]. For the "dq" frame, these components can cause the measured voltage vector $V_{\alpha\beta}^p$ or $V_{dq}^p$ to rotate around a "steady state" measured voltage vector $V_{dq}^{p1}$ in elliptical or circular orbits, although the overall trajectory may be very complex due to the effects of many superimposed effects.

If the "dq" frame is used, the negative-sequence, DC, and higher-order harmonics can be filtered from the measured voltage vector $V_{dq}^p$ to leave only the positive-sequence fundamental components given by a "steady state" measured voltage vector $V_{dq}^{p1}$, preferably by averaging $V_{dq}^p$ over 1 AC cycle time, where 1 AC cycle time is the period of the AC output produced by the inverter i.e. 1/f seconds, e.g. using information from the PLL 110. The averaging may be performed by the single cycle averaging component 125 described below, for example. If the "αβ" frame is used, then either Fourier techniques [16] [17] or other band-pass filtering techniques could be used [3]. Similar techniques can also be used in the "dq" frame.

From here, the description mostly assumes use of the Park transformation to transform voltages and currents into the "dq" frame. However, it should be appreciated that the same principles could also be applied using the "α,β" frame, another reference frame, or without using any reference frame.

FIGS. 2a-d are diagrams of the inverter 1 shown FIG. 1, which include different possible implementations of the controller 10 included in the inverter 1 of FIG. 1.

Figure 2A:
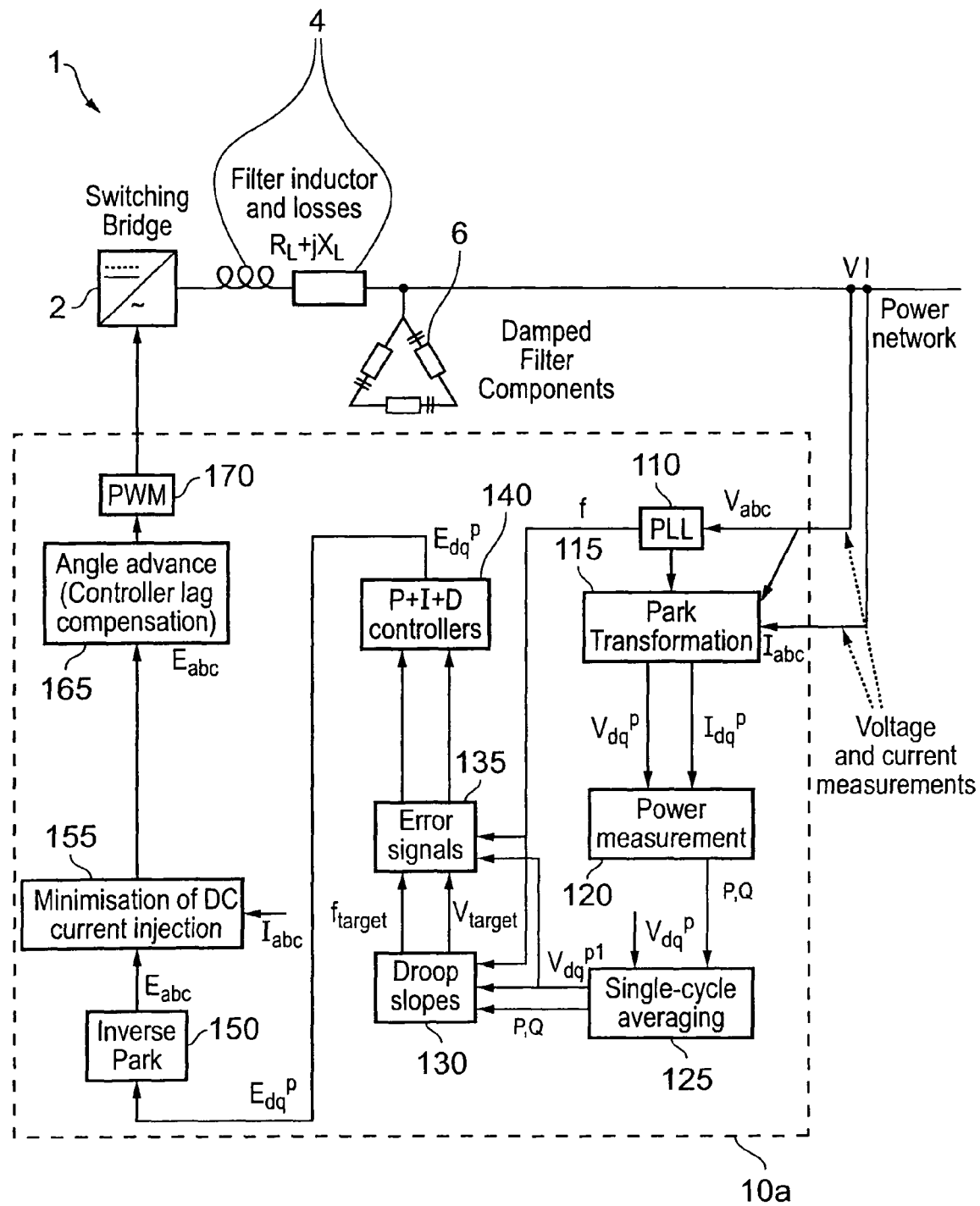
FIGS. 2a-d are diagrams of the inverter shown in FIG. 1, which include different possible implementations of the controller included in the inverter of FIG. 1.
Figure 2B:
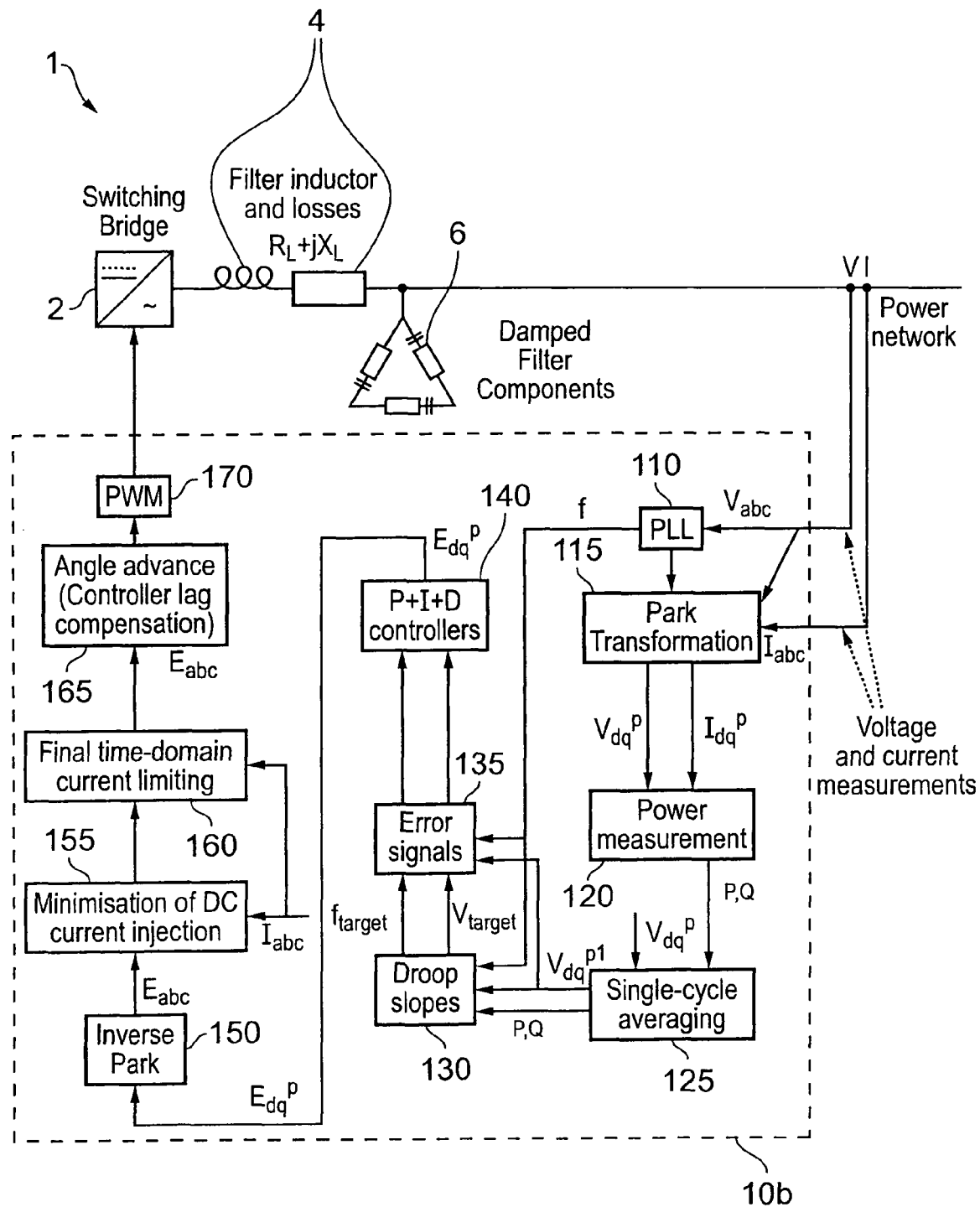
Figure 2C:
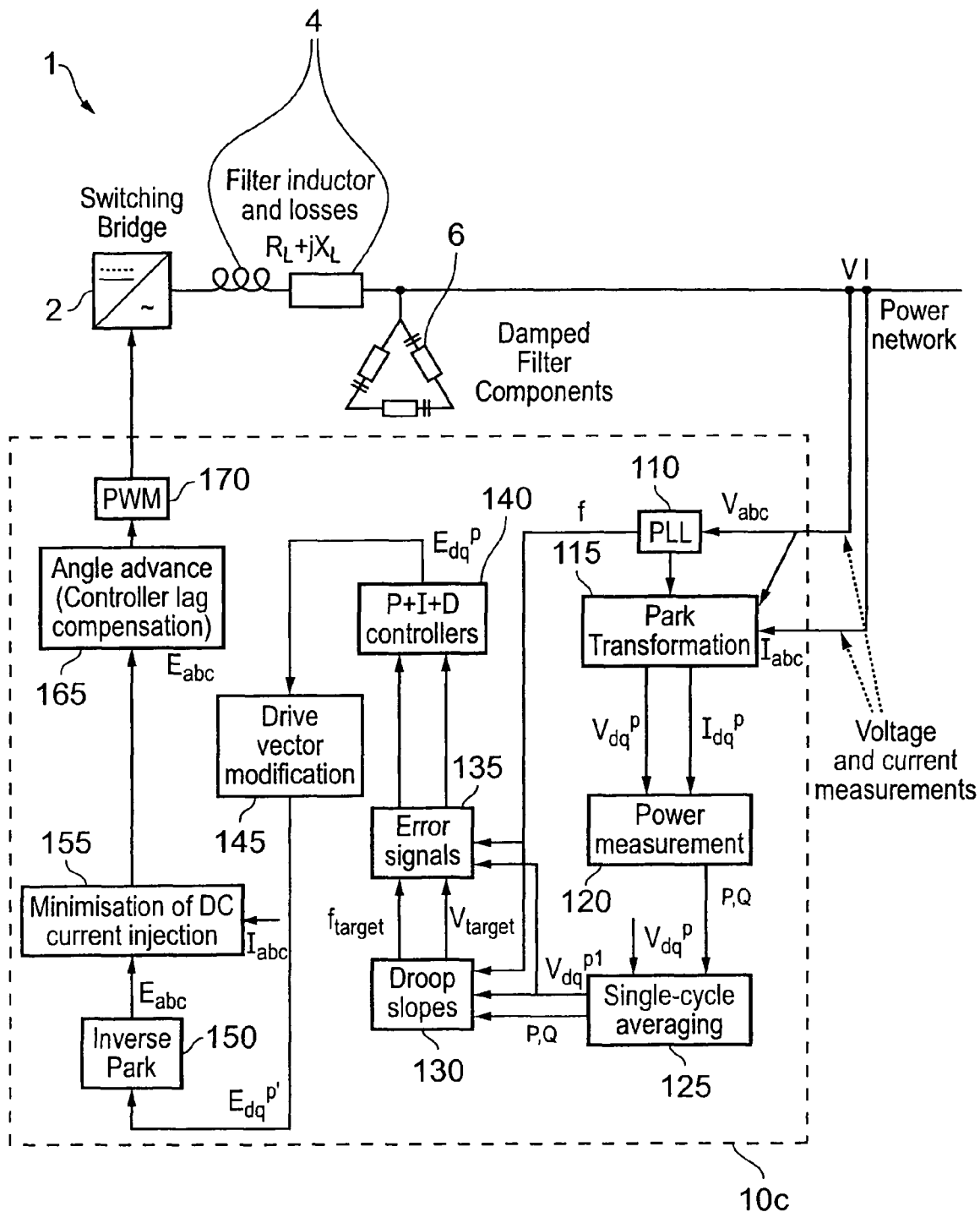
Figure 2D:
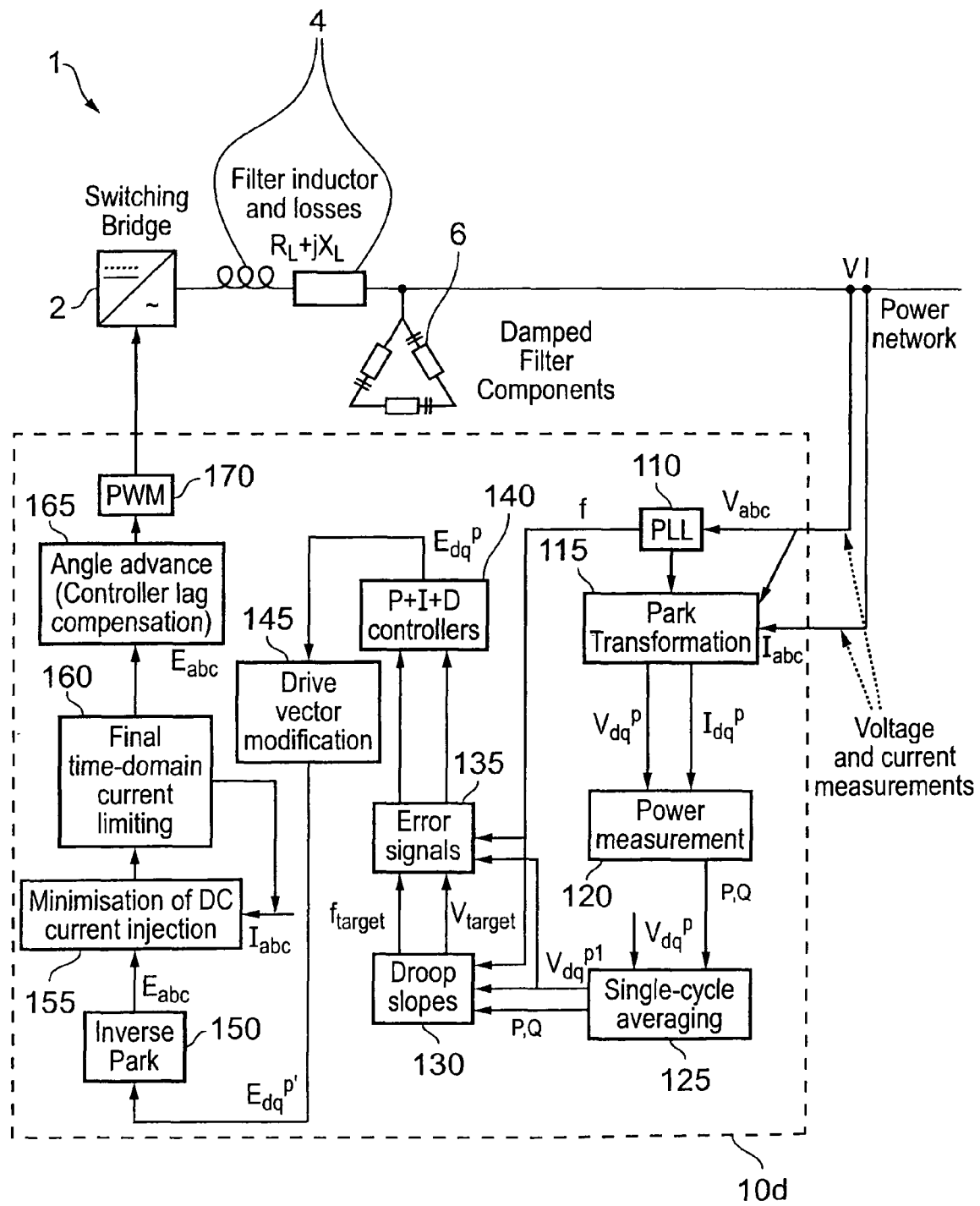

The controllers 10c, 10d shown in FIGS. 2c and 2d are preferred implementations of the controller 10a included in the inverter 1 of FIG. 1. The controllers 10a, 10b shown in FIGS. 2a and 2b are shown for comparative purposes.

The controller 10a shown in FIG. 2a preferably has the following components: a phase lock loop (PLL) 110, a Park transformation component 115, a power measurement component 120, a single-cycle averaging component 125, a droop slopes component 130, an error signals component 135, proportion-integral-derivative (PID) controllers 140, an inverse Park component 150, a minimisation of DC current injection component 155, an angle advance (controller lag compensation) component 165, and a pulse width modulation (PWM) component 170.

The controller 10*b* of FIG. 2*b* is the same as that of FIG. 2*a*, but has been modified to additionally include a final time domain current limiting component 160.

The controller 10*c* of FIG. 2*c* is the same as that of FIG. 2*a*, but has been modified to additionally include a drive voltage vector modification component 145.

The controller 10*d* of FIG. 2*d* is the same as that of FIG. 2*a*, but has been modified to additionally include a drive voltage vector modification component 145 and a final time domain current limiting component 160.

Note that each component shown in FIGS. 2*a-d* may respectively be implemented in software (e.g. as software code) and/or hardware (e.g. as physical circuitry).

Referring to the controller 10*a* of FIG. 2*a*, the controller 10*a* is preferably configured to measure a voltage of an AC output produced by the inverter; determine a drive voltage for controlling the inverter; and control the inverter based on the drive voltage. Preferably, these steps are included in a control frame, with the controller 10*a* being configured to repeat the control frame, e.g. at regular intervals, e.g. at a frequency of 1.5-4 kHz.

Preferably, the control frame also includes: if a measured current of an AC output produced by the inverter 1 exceeds a predetermined threshold, modifying a drive voltage to reduce the current of the AC output produced by the inverter; and/or if a difference in amplitude and/or phase between the drive voltage (e.g. provided as a drive voltage vector in a two-dimensional reference frame) and a measured voltage (e.g. converted to a measured voltage vector in a two-dimensional reference frame) exceeds a predetermined threshold, modifying the drive voltage to reduce the difference in amplitude and/or phase between the drive voltage and the measured voltage. Examples of how such operations can be implemented are described below with reference to FIGS. 2*b-d*.

The controller 10*a* shown in FIG. 2*a* preferably implements a method of controlling the inverter 1 ("control scheme") that uses voltage control loop, a rotating reference frame, PID controllers 140, and "FV" (frequency and voltage) control. However, similar diagrams could equally be drawn for inverters implementing a method that uses a stationary reference frame, e.g. with PR (proportional and resonant) controllers, and/or for inverters using "PQ" (active and reactive power) control.

The drive voltage determined by the controller 10*a* is preferably a three-phase drive voltage and for controlling the inverter e.g. to produce a three-phase AC output based on the three-phase drive voltage. It may be produced, for example, based on a three-phase measured voltage and/or three-phase current of an AC output produced by the inverter, e.g. the above-described three-phase measured voltage $V_{abc}=V_a,V_b,V_c$ or three phase current $I_{abc}=I_a,I_b,I_c$. Control schemes which use a drive voltage are known in the art. For the avoidance of any doubt, the drive voltage may be a theoretical voltage, e.g. represented by a value or set of values that is/are used to control the inverter, but not actually produced as a voltage during the method.

Preferably, the three-phase drive voltage is for controlling the inverter indirectly, e.g. with the controller 10*a* producing switching signals (e.g. pulse width modulated signals) for controlling the one or more switches of the inverter 1 to produce a three-phase output voltage based on the three-phase drive voltage.

By way of example, each phase of a three-phase output voltage produced by the one or more switches could have a respective rectangular waveform with a duty cycle that is based on a respective phase of the three-phase drive voltage, e.g. with each rectangular waveform corresponding to, e.g. having an average voltage that is approximately equal to, substantially equal to or approximately linearly proportional to, a respective phase of the three-phase drive voltage.

Preferably, the three-phase drive voltage is provided as a "drive voltage" vector $E_{dq}^P$ in the same two-dimensional reference frame as the measured voltage vector $V_{dq}^P$. The drive voltage vector $E_{dq}^P$ may be phase advanced (or retarded) from $V_{dq}^{P1}$ by a particular angle $\delta$, and may have a particular vector magnitude $|E_{dq}^P|$. As is known in the art, two proportional-integral or proportion-integral-derivative (PID) controllers 140 can be used to determine $\delta$ and $|E_{dq}^P|$ if a rotating e.g. "dq" reference frame is used, since the vectors $V_{dq}^{P1}$ and $E_{dq}^P$ will generally not be rotating, and will normally be close to the point 1+0j (pu, per-unit). If a stationary e.g. "αβ" reference frame is used, then two proportional-plus-resonant (PR) controllers can be used [4] [7].

There are different options for the input error signals to the PID controllers 140. In an islanded mode, or if the inverter is playing an active part in frequency/voltage control, then "FV" control is preferably used, e.g. with error signals, e.g. produced by the error signals component 135, being:

Frequency error (target minus f actually measured from the PLL) to the $\delta$ controller.

Voltage error (target minus $|V_{dq}^{P1}|$ actually measured from the PLL) to the $|E_{dq}^P|$ controller.

Both frequency and voltage targets are preferably drooped, e.g. by the droop slopes component 130, with appropriate slopes and responses (based upon measured active and reactive power flows respectively) e.g. so as to allow both active and reactive power sharing between inverters, without power flow oscillations or circulating currents, e.g. using the droop slopes component 130. To droop frequency and voltage targets, real and reactive power P,Q are preferably calculated, e.g. by the power measurement component 120.

If the inverter 1 is grid-connected to a large power system (relative to its rating) then a "PQ" control method can be used, where the targets are given not as frequency or voltage but as active and reactive power. In this case, error signals to the PID controllers 140, e.g. produced by the error signals component 135, could be:

Active power error (target minus actually measured) to the $\delta$ controller.

Reactive power error (target minus actually measured) to the $|E_{dq}^P|$ controller.

Here, attention is preferably paid to the implementation of droop slopes to the active and reactive power targets (against frequency and voltage respectively). When connected to stiff grids in normal operation, it might be possible to set droop slopes that leave the active and reactive power targets invariant against frequency and voltage. Such a control method might even be suitable for brief faults, if the control bandwidths are slow enough or control outputs can be "held" during the fault. During sustained fault conditions, however, this mode might be inappropriate.

In either "FV" or "PQ" control, the control bandwidths need not be high, and the controllers therefore lend themselves to low switching frequency operation, e.g. 1.5-4 kHz. An idea behind this is to replicate the effect of a synchronous generator, by synthesising a relatively invariant balanced sinusoidal voltage source $E_{dq}^P$ hidden by its "transient reactance", which physically is the primary inverter filter inductance $R_L+jX_L$, connected between the switching bridge and the filter capacitors.

To close the control loops with hardware, the drive voltage vector $E_{dq}^P$ is preferably converted to a three-phase voltage (i.e. to the three-phase drive voltage that was being represented by the drive voltage vector $E_{dq}^P$), e.g. by creating the complex vector $E_{dq}^P$ from δ and $|E_{dq}^P|$, and then using an inverse Park transformation (for the synchronous rotating reference frame version), e.g. as applied by the inverse Park component 150, or using an inverse Clarke transformation (for the stationary reference frame version) to provide the three-phase drive voltage $E_{abc}=E_a, E_b, E_c$.

As noted above, the controller 10a preferably controls the inverter 1 based on the three-phase drive voltage $E_{abc}$, e.g. by producing switching signals (e.g. pulse width modulated signals) for controlling the one or more switches of the inverter 1 based on the three-phase drive voltage $E_{abc}$ to produce a three-phase output voltage based on the three-phase drive voltage $E_{abc}$. By way of example, each phase of a three-phase output voltage produced by the one or more switches could have a respective rectangular waveform with a duty cycle that is based on a respective phase of the three-phase drive voltage $E_{abc}$, e.g. with each rectangular waveform corresponding to, e.g. having an average voltage that is approximately equal to, substantially equal to or approximately linearly proportional to, a respective phase of the three-phase drive voltage $E_{abc}$.

The switching signals may be produced by the PWM component 170, for example.

It is often desirable to also make small adjustments to the three-phase drive voltage $E_{abc}$, before it is used to produce switching signals, using control loops to minimise any DC currents which can flow from such inverters, due e.g. to small asymmetries in component properties and finite PWM timing resolution. This may be implemented by the minimisation of DC current injection component 155, for example.

Also, an angle advance compensator 165 may apply a phase advance to the three-phase drive voltage $E_{abc}$. This may be used to compensate for a finite controller/switching time lag between the instant of measurement of $V_{abc}$ and the midpoint of the first switching duty cycle at which the new values of $E_{abc}$ appear at the switching bridge 2. This time lag may typically be of the order of 1 to 2 switching frames.

The controller 10a would be able to function without the compensator 165, but use of a compensator 165 helps to reduce the required action from the controllers 140, and can also improve the implementation of a drive voltage vector modification component 145 (described below with reference to FIGS. 2c and 2d).

The method of controlling an inverter implemented by FIG. 2a has been found to be viable within inverters during non-fault conditions. It has excellent network support properties on the AC network side, although unbalance and harmonics on the AC network voltages do tend to result in higher levels of ripple on the DC bus than with more conventional current-control methods.

A problem with the method of controlling an inverter implemented by FIG. 2a is that during a fault, an overcurrent will generally result, due to the relatively slow bandwidth of the inner voltage (δ and $|E_{dq}^P|$) control loops, and the lack of any direct control over the output currents or bridge currents (currents at the switching bridge 2).

Figure 3A:
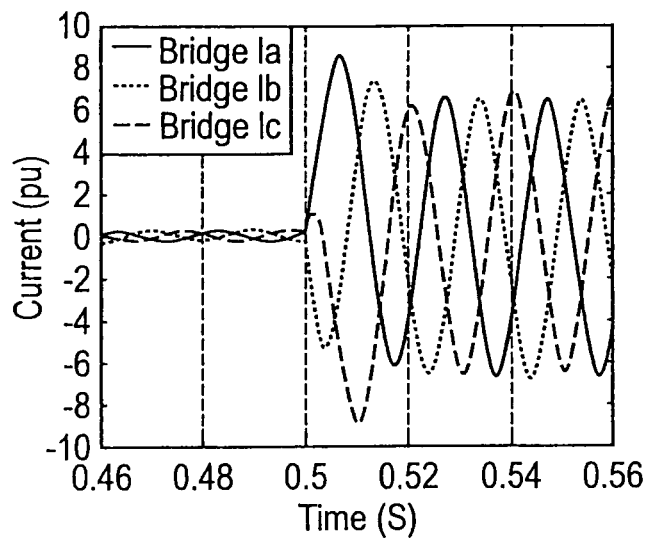
FIGS. 3a-c are plots, produced in a simulation, showing the bridge currents which result using the controller of FIG. 2a due to close-in faults.
Figure 3B:
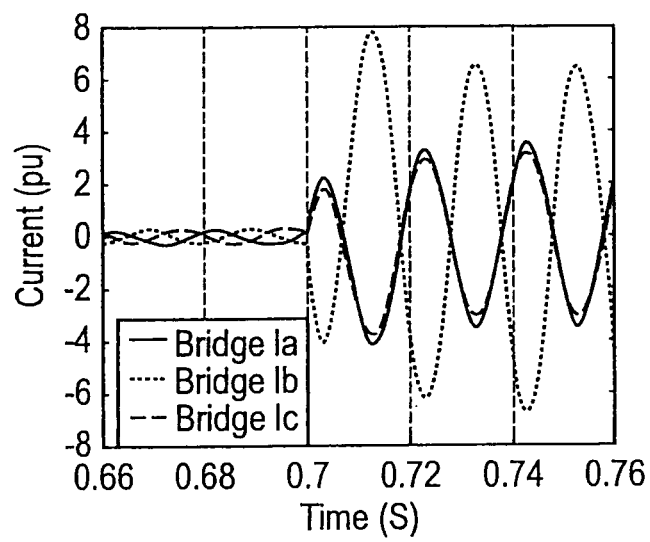
Figure 3C:
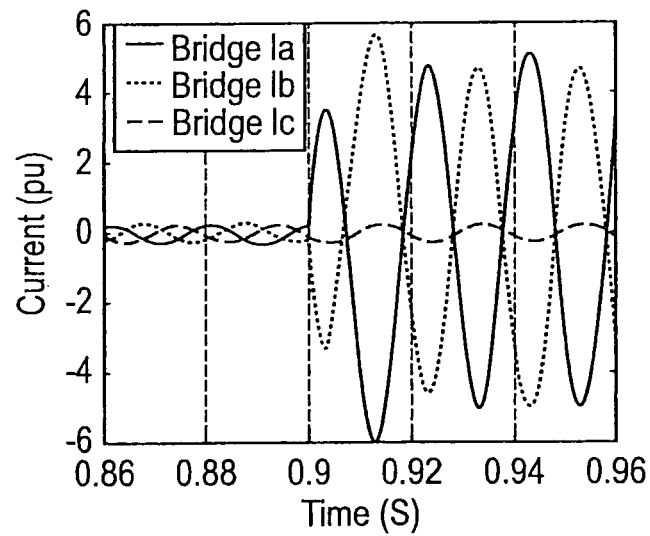

FIGS. 3a-c are plots, produced in a simulation, showing the bridge currents which result using the controller 10a of FIG. 2a due to close-in faults. Three faults are shown: a balanced three-phase (to ground) fault (FIG. 3a), a two-phase (phase-to-phase) fault (FIG. 3b), and a single phase-to-ground fault (FIG. 3c).

From FIGS. 3a-c, it can be seen that the currents peak at almost 8 pu (per unit), because the inverter filter inductance is about 0.15 pu. Note that, for the purposes of the simulation, the faults are applied within the main network, and the inverter 1 is connected through a star-delta transformer. This affects the fault currents so that, for example, the single-phase fault produces over-currents in two phases within the inverter 1.

To counter this, it is possible at a late (e.g. final) stage to modify the three-phase drive voltage $E_{abc}$, in order to attempt to avoid any values of $I_{abc}$ which exceed design limits. Because it is typically applied at a late stage, this technique can be referred to as "last ditch" overcurrent limiting.

The controller 10b of FIG. 2b preferably implements "last ditch" overcurrent limiting, e.g. by the final time domain current limiting component 160 being configured to, if a measured current (e.g. any phase $I_a$, $I_b$, $I_c$ of the above-described measured three-phase current $I_{abc}$) exceeds a predetermined threshold (there may be a respective predetermined threshold for each phase of the measured three-phase current $I_{abc}$), modify the three-phase drive voltage $E_{abc}$ to reduce the current of the AC output produced by the inverter, e.g. so as to attempt to avoid any values of $I_{abc}$ which exceed design limits.

By way of example, the "last ditch" overcurrent limiting can be achieved with a simple threshold scheme which leaves each phase $E_a$, $E_b$, and $E_c$ of the three-phase drive voltage $E_{abc}$ alone if they are less than the design limits, but, otherwise, temporarily modifies each phase of the three-phase drive voltage $E_{abc}$ by suitable quantities to bring the current(s) back within respective design limits as soon as possible. Ideally this will be by the next control frame. An example of how to achieve this for a single phase is given in Equation (6) below, although other options exist, including (high-bandwidth) control loops:

$$E_{adjust} = \begin{cases} -k\left((|I| - I_{max})\left(R_L + \frac{X_L}{2\pi f \cdot T_s}\right) + \frac{X_L}{2\pi f}\frac{dI}{dt}\right), & I > I_{max} \\ k\left((|I| - I_{max})\left(R_L + \frac{X_L}{2\pi f \cdot T_s}\right) + \frac{X_L}{2\pi f}\frac{dI}{dt}\right), & I < -I_{max} \\ 0, & \text{otherwise} \end{cases} \quad (6)$$

for each phase where $E_{adjust}$ is the amount by which each phase $I_a$, $I_b$, $I_c$ of the three-phase drive voltage $E_{abc}$ is respectively adjusted, $T_s$ is the control frame time and k is a gain constant, typically in the range 0.5 to 2. Note that Equation (6) is preferably evaluated individually for each phase. After all three phases have been dealt with, it may also be required to remove the zero-sequence component from the three-phase drive voltage $E_{abc}$.

Figure 4A:
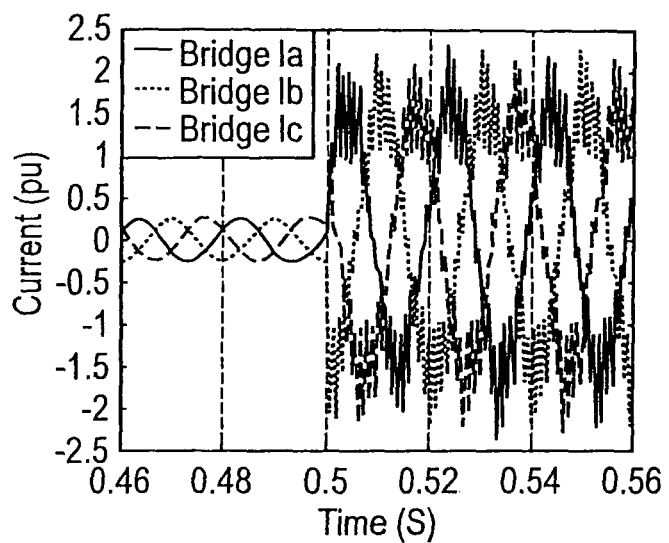
FIGS. 4a-c are plots, produced in a simulation, showing the bridge currents which result using the controller of FIG. 2b due to close-in faults.
Figure 4B:
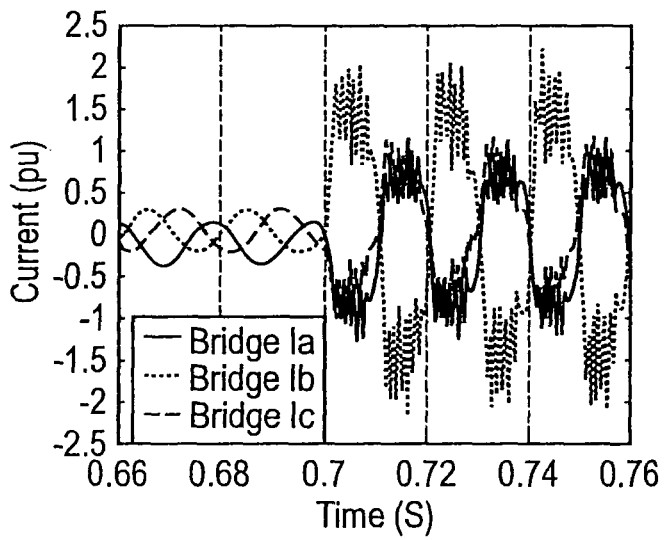
Figure 4C:
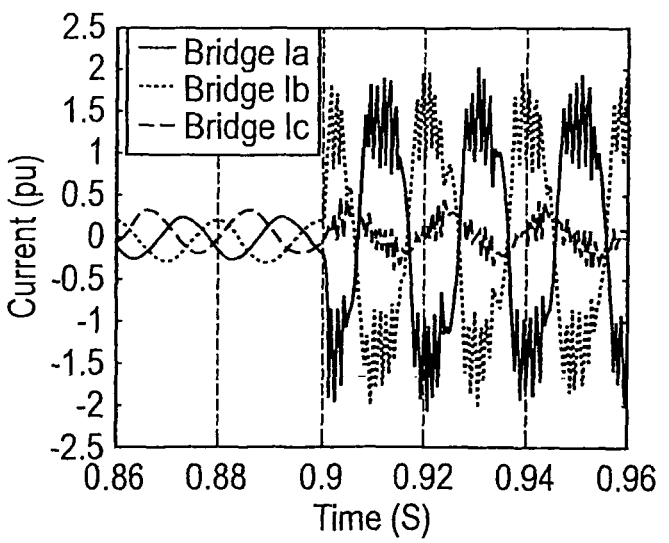

FIGS. 4a-c are plots, produced in a simulation, showing the bridge currents which result using the controller 10b of FIG. 2b due to close-in faults. Three faults are shown: a balanced three-phase (to ground) fault (FIG. 4a), a two-phase (phase-to-phase) fault (FIG. 4b), and a single phase-to-ground fault (FIG. 4c).

In the simulation used to produce FIGS. 4a-c, $I_{max}$ was set to 1.25 pu, and k to 2.

As can be seen from FIGS. 4a-c, relying on "last ditch" overcurrent limiting alone can lead to relatively nasty or "harsh" waveforms, since the response is generally of high bandwidth and so generally needs to produce harsh adjustments to the drive voltages. Although not shown in FIGS. 4a-c, setting k to less than 2 generally results in larger over-currents and is generally not effective.

The present invention has been devised in light of these considerations and preferably involves, if a difference in amplitude and/or phase between the drive voltage and the measured voltage exceeds a predetermined threshold, modifying the drive voltage to reduce the difference in amplitude and/or phase between the drive voltage and the measured voltage.

Preferably, this modification is performed in a stationary or rotating two-dimensional reference frame, e.g. the "αβ" or "dq" reference frame described above. If the modification is performed in a two-dimensional reference frame, then it can be viewed as characterised as "a limiting method in a stationary or rotating two-dimensional frame".

For example, rather than waiting until any of the individual "phase" currents within the measured three-phase current $I_{abc}$ become larger than a threshold $I_{max}$, a simple limiting step can first be applied to the three-phase drive voltage (which may be represented by the drive voltage vector $E_{dq}^P$), such that it does not deviate too far in amplitude and/or phase from the three-phase measured voltage (which may be represented by the measured voltage vector $V_{dq}^P$). The rationale behind this is as follows.

Figure 5:
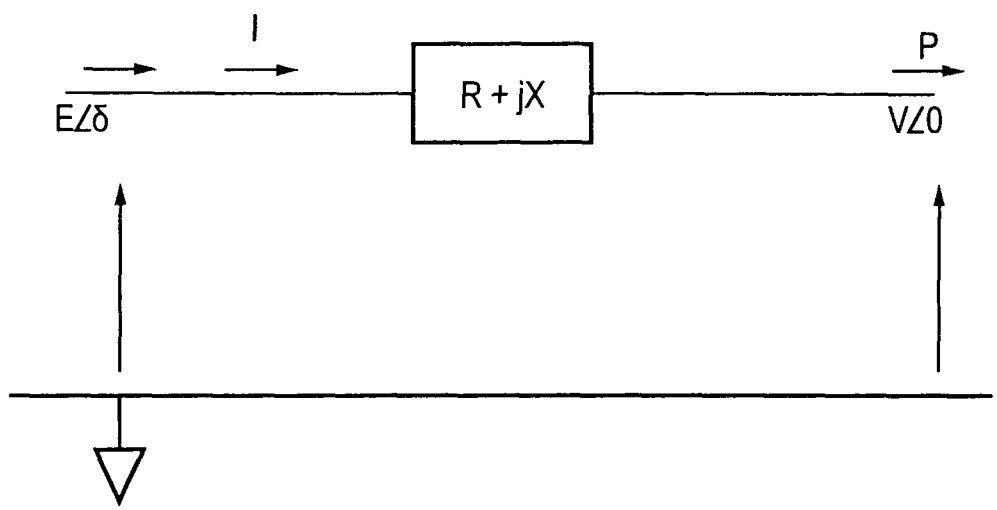
FIG. 5 is a diagram shows how steady-state current and power flow (active and reactive) across a lossy inductor can be determined when a drive voltage $E \angle \delta$ is applied at a left hand side, and a voltage $V \angle 0$ is measured at the other side.

FIG. 5 is a diagram shows how steady-state current and power flow (active and reactive) across a lossy inductor can be determined when a drive voltage $E\angle\delta$ is applied at a left hand side, and a voltage $V\angle 0$ is measured at the other side (in FIG. 5, the notation "$\angle\phi$" means "at a phase angle of $\phi$").

In this analysis, it is assumed that the system is at steady-state, with all voltages and currents balanced and perfectly sinusoidal. In other words, the analysis presents a phasor (or vectorial) solution only, rather than an accurate dynamic transient representation of the full 3-phase system.

The following is an extension of the well-known equation V=IR.

$$I = \frac{E\angle\delta - V}{R + jX} \quad (7)$$

In order to analyse the potential for overcurrent, we need to find the magnitude of the potential resulting current flow.

$$|I| = \frac{|E\angle\delta - V|}{|R + jX|} \quad (8)$$

which is the magnitude of the vector distance between the voltages, divided by the magnitude of the complex impedance (with all values in per-unit).

Therefore, to attempt to limit steady-state balanced fundamental currents to a value of less than or equal to $I_{max}$, we would expect to limit the magnitude of the vector $E\angle\delta-V$ such that it is less than or equal to $I_{max}\cdot|R+jX|$, i.e.

$$|E\angle\delta - V| \leq \alpha \cdot I_{max}\sqrt{R^2+X^2} \quad (9)$$

Here a factor α has been introduced. This has a value of notionally unity, although it can be optimised to provide the best performance.

In effect, Equation (9) limits a difference in magnitude and/or phase between the drive voltage $E\angle\delta$ and the measured voltage V.

The controller 10c of FIG. 10c preferably implements Equation (9), e.g. by the drive voltage vector modification component 145 being configured to take the relatively steady value of the drive voltage vector $E_{dq}^P$ from the δ and $|E_{dq}^P|$ voltage control loops, and then, if a difference between the drive voltage vector $E_{dq}^P$ and the measured voltage vector $V_{dq}^P$ exceeds the predetermined threshold $\alpha \cdot I_{max}\sqrt{R_L^2+X_L^2}$, modifying the drive voltage vector $E_{dq}^P$ to reduce the difference between the drive voltage vector $E_{dq}^P$ and the measured voltage vector $V_{dq}^P$, e.g. resulting in a modified drive voltage vector $E_{dq}^{P'}$.

Because the two-dimensional reference frame is constructed such that a vector in the two-dimensional reference frame provides information about the phase and amplitude of a voltage or current, a difference $(E_{dq}^P - V_{dq}^P)$ between the drive voltage vector $E_{dq}^P$ and the measured voltage vector $V_{dq}^P$ in the two-dimensional reference frame is representative of a difference in amplitude and/or phase between the three-phase drive voltage $E_{abc}$ and the three-phase measured voltage $V_{abc}$. Accordingly, modifying the drive voltage vector $E_{dq}^P$ to reduce a difference between the drive voltage vector $E_{dq}^P$ and the measured voltage vector $V_{dq}^P$ in the "dq" frame if the difference exceeds a predetermined threshold is the same as modifying the three-phase drive voltage $E_{abc}$ to reduce a difference in amplitude and/or phase between the three-phase drive voltage $E_{abc}$ and the three-phase measured voltage $V_{abc}$.

There are many different ways in which the drive voltage vector $E_{dq}^P$ could be modified to reduce a difference between the drive voltage vector $E_{dq}^P$ and the measured voltage vector $V_{dq}^P$, for example, the drive voltage vector $E_{dq}^P$ could be modified, e.g. so as to limit its value, e.g. dependent upon an "instantaneous" measured voltage vector $V_{dq}^P$ e.g. as measured at the PLL 110, e.g. according to the equation:

$$|E_{dq}^{P'} - V_{dq}^P| = \min(\alpha \cdot I_{max}\sqrt{R_L^2+X_L^2}, |E_{dq}^P - V_{dq}^P|)$$

$$\angle(E_{dq}^{P'} - V_{dq}^P) = \angle(E_{dq}^P - V_{dq}^P) \quad (10)$$

According to Equation (10), the drive voltage vector $E_{dq}^P$ is modified so that the difference between the modified drive voltage vector $E_{dq}^{P'}$ and the measured voltage vector $V_{dq}^P$ is made the lesser value of $\alpha \cdot I_{max}\sqrt{R_L^2+X_L^2}$ and $|E_{dq}^P-V_{dq}^P|$, while the phase angle of the difference between the modified drive voltage vector $E_{dq}^{P'}$ and the measured voltage vector $V_{dq}^P$ is left identical to the phase angle of the difference between the drive voltage vector $E_{dq}^P$ and the measured voltage vector $V_{dq}^P$.

Figure 6:
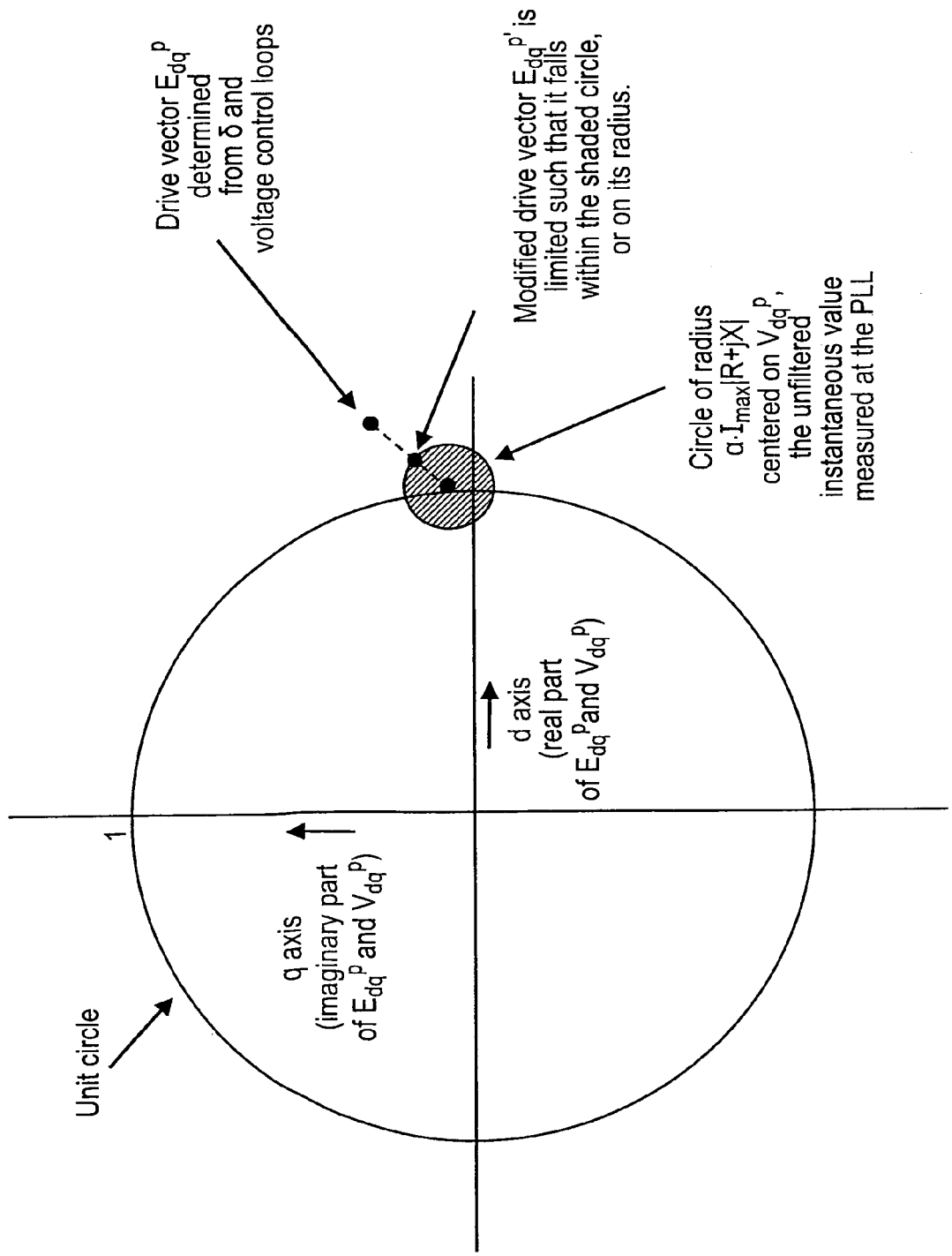
FIG. 6 is a graphical representation of Equation (10), discussed below.

FIG. 6 is a graphical representation of Equation (10).

Note that the measured voltage vector $V_{dq}^P$ used in Equation (10) preferably represents an "instantaneous", e.g. unfiltered and/or unaveraged, three-phase voltage measured at the PLL 110, rather than an averaged or filtered value such as $V_{dq}^{P1}$.

Other equations for modifying the drive voltage vector $E_{dq}^P$ could also be envisaged. For example, instead of limiting the difference between the measured voltage vector $V_{dq}^P$ and the drive voltage vector $E_{dq}^P$ to a circle in the "dq" frame (as shown in FIG. 6), the difference could instead be limited to a square or oblong box in the "dq" frame (this may produce slightly inferior results, but is likely to be easier to implement in software).

For the avoidance of any doubt, the above described "predetermined threshold" need not be a fixed value and could be one of a plurality of predetermined thresholds. For example, in a power system with a wide frequency range, the per-unit value of $X_L$ could be dependent upon the frequency f, thereby causing the threshold to change over time. Additionally, the parameter α could be adjusted, e.g. depending on component temperatures or operational priorities, e.g. so as to allow different per-unit values of overcurrent at different times depending upon component temperatures or operational priorities. Either of these two adjustments, as examples, might lead to real-time adjustment of the thresholds.

Since the above-described method of reducing the difference between a three-phase drive voltage and a three-phase measured voltage is based upon a phasor analysis, it can be expected to work well for steady-state balance faults. During the steady-state portion of such a fault, the measured voltage vector $V_{dq}^P$ will generally be relatively steady at a value with magnitude significantly less than 1 pu, and the limiting will work well. However, at fault inception, or the removal of the fault condition, the measured voltage vector $V_{dq}^P$ may rapidly traverse a trajectory from one point to another, possibly with oscillations and irregular velocity. During these transient timeframes, the voltage and current waveforms may contain harmonic, DC (the $0^{th}$ harmonic), and negative sequence components, which may not be explicitly accounted for in the "dq" frame limiting. However, the preferred use of an "instantaneous", e.g. unfiltered and/or unaveraged, measured voltage vector $V_{dq}^P$, rather than the filtered or averaged value $V_{dq}^{P1}$, in the method of reducing the difference between a three-phase drive voltage and a three-phase measured voltage, means that the harmonics and negative sequence are partly accounted for. The higher order voltage harmonics are not of so much concern, since the resulting currents are limited by the impedance of the inductor which increases approximately linearly with harmonic order. The $0^{th}$ harmonic (DC voltage offsets and DC current offsets) however, are a significant concern, since the magnitude of the impedance of the inductor is extremely low at DC. The exact effect generally depends upon the point-on-wave at which the transient(s) occur, having a similar effect to transformer inrush.

Similarly, for unbalanced faults, although the above-described method of reducing the difference between a three-phase drive voltage and a three-phase measured voltage may not be theoretically fully effective in all scenarios, it can be partly effective at limiting the currents due to negative sequence voltage dips. Again, the $0^{th}$ harmonic is a significant concern, due to the inductor impedance.

This can be shown by running a simulation based on the controller 10c shown in FIG. 2c, which preferably includes a drive voltage vector modification component 145 that preferably implements the above-described method of reducing the difference between a three-phase drive voltage and a three-phase measured voltage, but does not implement the "last ditch" overcurrent limiting of $I_{abc}$ (it does not have the final time domain current limiting component 160).

Figure 7A:
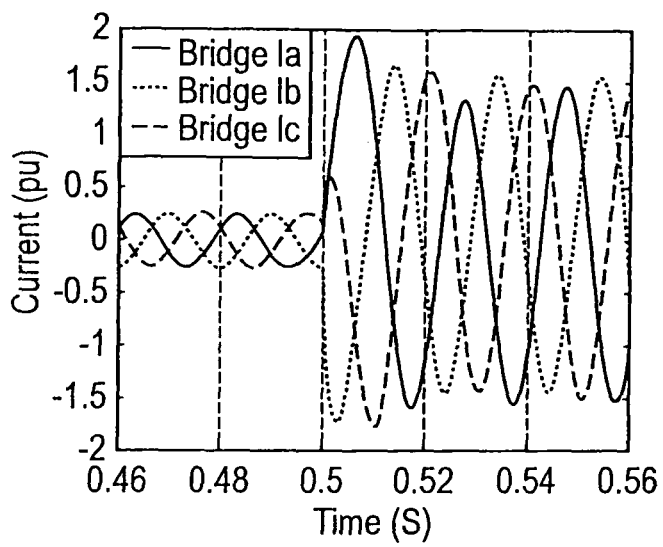
FIGS. 7a-c are plots, produced in a simulation, showing the bridge currents which result using the controller of FIG. 2c due to close-in faults.
Figure 7B:
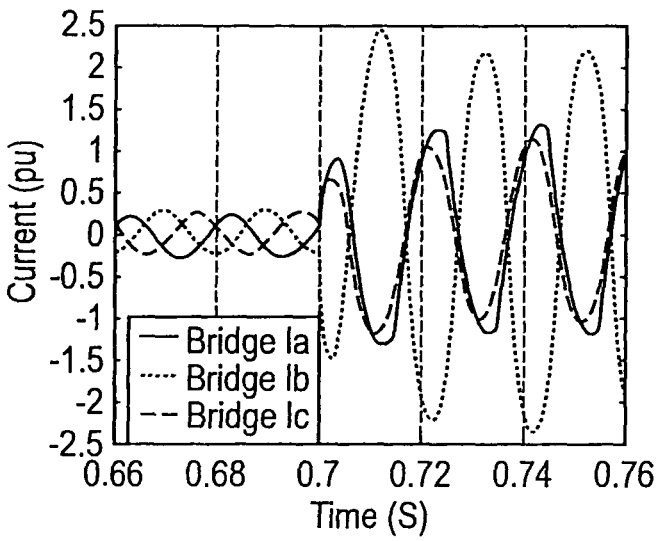
Figure 7C:
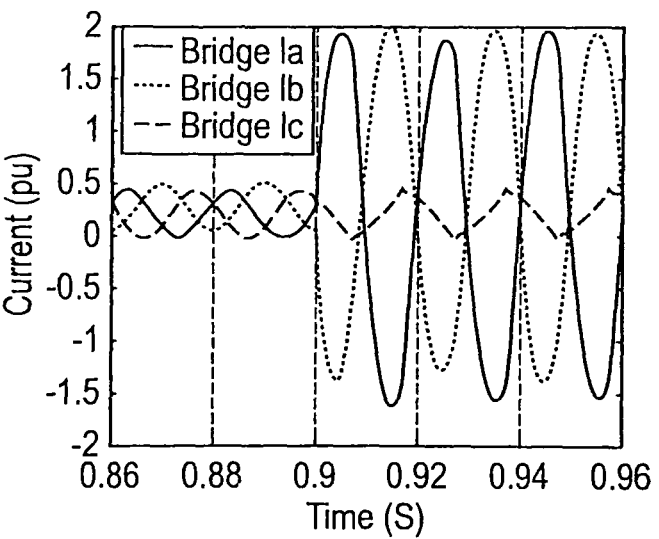

FIGS. 7a-c are plots, produced in a simulation, showing the bridge currents which result using the controller 10c of FIG. 2c due to close-in faults. Three faults are shown: a balanced three-phase (to ground) fault (FIG. 7a), a two-phase (phase-to-phase) fault (FIG. 7b), and a single phase-to-ground fault (FIG. 7c).

In the simulation, $I_{max}$ was still set to 1.25 pu, and $\alpha$ was set to 1.25

It can be seen that, compared to FIGS. 3a-c, the peak overcurrents in FIGS. 7a-c are reduced from 8 pu to 2 pu, without using the harsh "last ditch" overcurrent limiting of $I_{abc}$. However, the peak currents still exceed the value of $I_{max}$=1.25 More strictly, in this case, since a value $\alpha$=1.25 was used, expected peak currents for balanced cases should be limited to $I_{max} \cdot \alpha$=1.25·1.25=1.56 pu. In the balanced case, after the initial transient period, it can be seen that the peak currents are limited to this value. However, in the unbalanced cases, sustained overcurrents still occur above the 1.56 pu level. The fault inception in the balanced case also shows decaying DC bias offsets which also cause brief overcurrents.

Due to the imperfect application to negative sequence and the potential for DC overcurrents, it is desirable to use the above-described method of reducing the difference between a three-phase drive voltage and a three-phase measured voltage in combination with the "last ditch" overcurrent of $I_{abc}$.

Accordingly, the controller 10d of FIG. 2d preferably includes both the drive voltage vector modification component 145 of FIG. 10c and the final time domain current limiting component 160 of FIG. 2b.

Figure 8A:
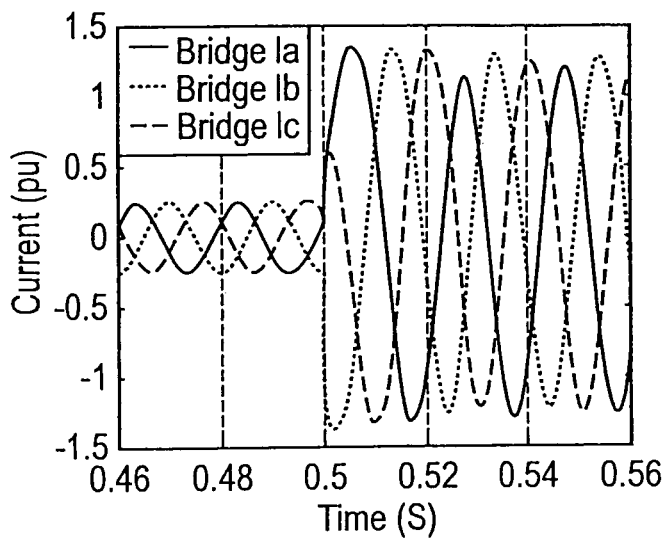
FIGS. 8a-c are plots, produced in a simulation, showing the bridge currents which result using the controller of FIG. 2d due to close-in faults.
Figure 8B:
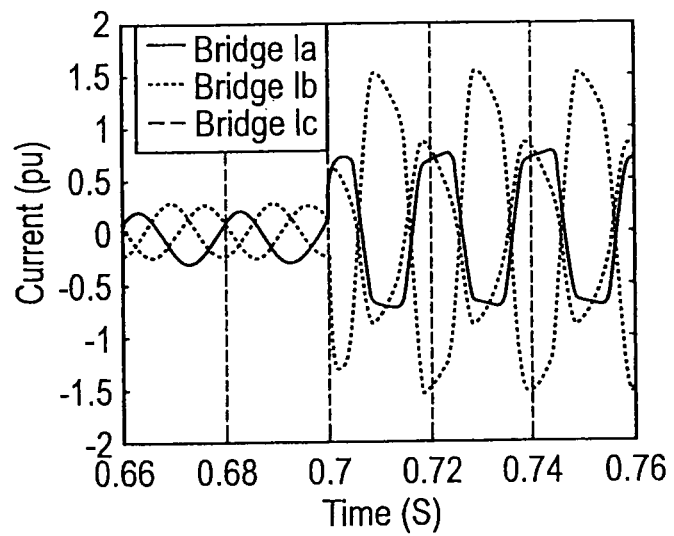
Figure 8C:
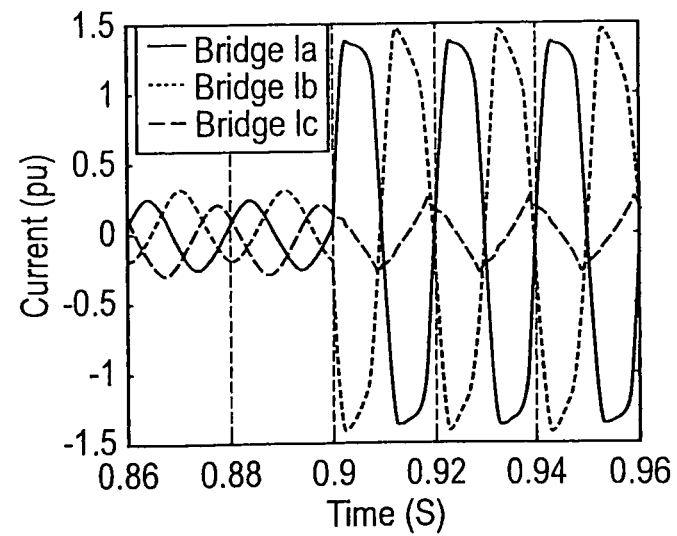

FIGS. 8a-c are plots, produced in a simulation, showing the bridge currents which result using the controller 10d of FIG. 2d due to close-in faults. Three faults are shown: a balanced three-phase (to ground) fault (FIG. 8a), a two-phase (phase-to-phase) fault (FIG. 8b), and a single phase-to-ground fault (FIG. 8c).

To obtain optimum performance, simulations over a number of different fault cases can be used to tune the gains $\alpha$ (notionally unity) and k. In the simulation used to produce FIGS. 8a-c, $I_{max}$=1.25, $\alpha$ (see Equation (10)) was 1.25 and k (see Equation (6)) was 0.5.

As can be seen from FIGS. 8a-c, due to the extremely beneficial action of the above-described method of reducing the difference between a three-phase drive voltage and a three-phase measured voltage (performed by the drive voltage vector modification component 145), it is found that the "last ditch" overcurrent limiting of $I_{abc}$ (performed by the final time domain current limiting component 160) is only used to make small adjustments to the three-phase drive voltage $E_{abc}$, during the initial fault inception (and removal), or when the fault is highly unbalanced. It can also be seen that the gain k of the "last ditch" overcurrent limiting of $I_{abc}$ can be reduced from 2 to 0.5, while still providing the same level of overall protection. This removes high-frequency oscillations when the $I_{abc}$ limitation is activated, and improves power quality during the fault.

FIGS. 8a-c appear to show the best performance from all the simulation results. This demonstrates the effective nature of the above-described method of reducing the difference between a three-phase drive voltage and a three-phase measured voltage (performed by the drive voltage vector modification component 145) at limiting overcurrents, especially when used in conjunction with "last ditch" overcurrent limiting of $I_{abc}$ (performed by the final time domain current limiting component 160). The use of the above-described method of reducing the difference between a three-phase drive voltage and a three-phase measured voltage (performed by the drive voltage vector modification component 145) allows much lower gains to be used within the "last ditch" overcurrent limiting of $I_{abc}$, leading to a smoother response and better power quality during faults.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, for an inverter having a neutral conductor, e.g. a four-wire three-phase inverter, rather than ignoring (or throwing away) "zero sequence" information in a Clarke/Park transformation, during a fault, any measured "zero sequence" information could be "fed-forward" to the calculation of a four-wire drive voltage vector which could be expressed as $E_{dq0}^P$ which includes the 2-dimensional positive sequence value $E_{dq}^P$ and also the zero sequence term $E_0$. The limiting performed by the drive voltage vector modification component 145 in the controllers 10c and 10d shown in FIGS. 2c and 2d could be enhanced to limit the difference between a four-wire drive voltage $E_{dq0}^P$ and a measured voltage $V_{dq0}^P$. This limiting could be carried out by use of a 3-dimensional sphere centred on $V_{dq0}^P$ similarly to the circle limiting described in Equation (10). Alternatively, the limiting could be carried out for $E_{dq}^p$ using circle limiting in the dq plane exactly as in Equation (10), with a linear limiting used to restrict $E_0$ within a given threshold of $V_0$. A limiting based on a 3-dimensional rectangular box around $V_{dq0}^p$ could also be used, which would possibly be easier to implement in software but might not be as effective. Other variants could be envisaged by a skilled person.

REFERENCES

[1] Roscoe, A. J., Finney, S. J., and Burt, G. M.: 'Tradeoffs between AC power quality and DC bus ripple for 3-phase 3-wire inverter-connected devices within microgrids', IEEE Transactions on Power Electronics, (in review)
[2] Ng, C. H., Ran, L., and Bumby, J.: 'Unbalanced-grid-fault ride-through control for a wind turbine invertor', IEEE Transactions on Industry Applications, 2008, 44, (3), pp. 845-856
[3] Song, H. S., and Nam, K.: 'Dual current control scheme for PWM converter under unbalanced input voltage conditions', IEEE Transactions on Industrial Electronics, 1999, 46, (5), pp. 953-959
[4] Plet, C. A., Graovac, M., Green, T. C., and Iravani, R.: 'Fault response of grid-connected inverter dominated networks'. IEEE Power and Energy Society General Meeting, Minneapolis, 25-29 Jul. 2010
[5] Kükrer, O.: 'Deadbeat control of a three-phase inverter with an output LC filter', IEEE Transactions on Power Electronics, 1996, 11, (1), pp. 16-23
[6] Mattavelli, P.: 'An improved deadbeat control for UPS using disturbance observers', IEEE Transactions on Industrial Electronics, 2005, 52, (1), pp. 206-212
[7] Ahmed, K. H., Massoud, A. M., Finney, S. J., and Williams, B. W.: 'Autonomous adaptive sensorless controller of inverter-based islanded-distributed generation system', IET Power Electronics, 2009, 2, (3), pp. 256-266
[8] Ahmed, K. H., Massoud, A. M., Finney, S. J., and Williams, B. W.: 'Sensorless Current Control of Three-Phase Inverter-Based Distributed Generation', IEEE Transactions on Power Delivery, 2009, 24, (2), pp. 919-929
[9] National Grid, Issue 4 Revision 3: 'The grid code', 2010, http://www.nationalgrid.com, accessed
[10] Eon-Netz, Status: 1 Apr. 2006: 'Grid code; high and extra-high voltage', 2006, http://www.eon-netz.com, accessed
[11] Eon-Netz, Updated: 1 Apr. 2008: 'Requirements for Offshore Grid Connections in the E. ON Netz Network', 2008, http://www.eon-netz.com, accessed
[12] Tsili, M., and Papathanassiou, S.: 'A review of grid code technical requirements for wind farms', IET Renewable Power Generation, 2009, 3, (3), pp. 308-332
[13] Alepuz, S., Busquets-Monge, S., Bordonau, J., Martinez-Velasco, J. A., Silva, C. A., Pontt, J., and Rodriguez, J.: 'Control Strategies Based on Symmetrical Components for Grid-Connected Converters Under Voltage Dips', IEEE Transactions on Industrial Electronics, 2009, 56, (6), pp. 2162-2173
[14] Krause, P. C., Wasynczuk, O., and Sudhoff, S. D.: 'chapter 5', in 'Analysis of electric machinery and drive systems', (New York: IEEE Press, 2002 2nd edn.), pp. 229-232
[15] Petrella, R., Revelant, A., and Stocco, P.: 'Robust Grid Synchronisation in Three-Phase Distributed Power Generation Systems by Synchronous Reference Frame Pre-Filtering'. Universities' Power Engineering Conference (UPEC), Glasgow, UK, 2009
[16] Roscoe, A. J., Burt, G. M., and McDonald, J. R.: 'Frequency and fundamental signal measurement algorithms for distributed control and protection applications', JET Generation, Transmission & Distribution 2009, 3, (5), pp. 485-495
[17] Roscoe, A. J., Blair, S. M., and Burt, G. M.: 'Benchmarking and optimisation of Simulink code using Real-Time Workshop and Embedded Coder for inverter and microgrid control applications'. Universities' Power Engineering Conference (UPEC), Glasgow, UK, 2009

All references referred to above are hereby incorporated by reference.

The invention claimed is:

1. A method of controlling an inverter for converting a DC input to an AC output, the method including:
   measuring a voltage of an AC output produced by the inverter;
   determining a modified drive voltage for controlling the inverter, the modified drive voltage being provided by a difference between a measured voltage and frequency and a target voltage and frequency, or a difference between a measured real power and reactive power and a target real power and reactive power; and
   if a difference in amplitude and/or phase between the modified drive voltage and the measured voltage exceeds a predetermined threshold, further limiting the modified drive voltage to reduce the difference in amplitude and/or phase between the modified drive voltage and the measured voltage, and if the difference in amplitude and/or phase between the modified drive voltage and the measured voltage does not exceed the predetermined threshold, not further limiting the modified drive voltage, wherein:
   the measured voltage is transformed into a measured voltage vector representative of the measured voltage in a stationary or rotating reference frame;
   the modified drive voltage is provided as a drive voltage vector representative of the modified drive voltage in the stationary or rotating reference frame; and
   the method includes, comparing the drive voltage vector and the measured voltage vector and determining whether there is a difference between the drive voltage vector and the measured voltage vector in the stationary or rotating reference frame that exceeds a pre-determined threshold, and if the difference exceeds the pre-determined threshold, then limiting the drive voltage vector to reduce the difference between the drive voltage vector and the measured voltage vector in the stationary or rotating reference frame.

2. The method according to claim 1, wherein the stationary or rotating reference frame is a two-dimensional reference frame.

3. The method according to claim 1, wherein the method includes:
   measuring a multi-phase voltage of the AC output produced by the inverter;
   determining a multi-phase drive voltage for controlling the inverter; and
   if a difference in amplitude and/or phase between the multi-phase drive voltage and the multi-phase measured voltage exceeds a pre-determined threshold, modifying the multi-phase drive voltage to reduce the difference in amplitude and/or phase between the multi-phase drive voltage and the multi-phase measured voltage.

4. The method according to claim 1, wherein the measured voltage vector and the drive voltage vector are provided by one of a Park transformation or a Clarke transformation, and the method further includes:
- carrying out an inverse transformation to provide a time domain drive vector voltage;
- measuring a current of the AC output produced by the inverter; and
- if the measured current exceeds a predetermined threshold, limiting the modified drive voltage in the time domain to reduce the current of the AC output produced by the inverter.

5. The method according to claim 1, wherein the method includes controlling the inverter based on the modified drive voltage.

6. The method according to claim 1, wherein the method includes controlling the inverter by producing switching signals for controlling one or more switches of the inverter based on the modified drive voltage.

7. The method according to claim 1, wherein one or more of the steps are included in a control frame, the method including repeating the control frame.

8. The method according to claim 1, wherein the method includes:
- measuring a multi-phase voltage of the AC output produced by the inverter, wherein the multi-phase measured voltage is converted into a measured voltage vector representative of the multi-phase measured voltage in a two-dimensional reference frame;
- determining a multi-phase drive voltage for controlling the inverter, wherein the multi-phase drive voltage is provided as a drive voltage vector representative of the multi-phase drive voltage in the two-dimensional reference frame; and
- if a difference between the drive voltage vector and the measured voltage vector in the two-dimensional reference frame exceeds a predetermined threshold, modifying the drive voltage vector to reduce the difference between the drive voltage vector and the measured voltage vector in the two-dimensional reference frame.

9. The method according to claim 1, wherein any multi-phase voltage is a three-phase voltage.

10. A non-transitory computer-readable medium having computer-executable instructions configured to cause a controller of the inverter to perform a method according to claim 1.

11. The method according to claim 1, further comprising controlling the inverter based on the modified drive voltage during a fault condition to provide fault ride-through operation.

12. The method according to claim 1, further comprising using the modified drive voltage to provide switching voltages for the inverter.

13. The method according to claim 1, wherein the predetermined threshold provides a limit for a magnitude of the modified drive voltage, thereby clipping the modified drive voltage when the modified drive voltage exceeds a pre-determined value.

14. The method according to claim 13, wherein the pre-determined determined value is determined by the equation $\alpha \cdot I_{max}\sqrt{R_L^2 + X_L^2}$.

15. The method according to claim 1, further comprising adjusting the modified drive voltage so that the frequency and/or voltage, or alternatively the real and/or reactive powers match a respective pre-determined value, and the comparison of the modified drive voltage and measured voltage vectors is carried out after adjusting the modified drive voltage.

16. A controller for controlling an inverter to convert a DC input to an AC output, the controller being configured to:
- measure a voltage of an AC output produced by the inverter;
- determine a modified drive voltage for controlling the inverter, the modified drive voltage being provided by a difference between a measured voltage and frequency and a target voltage and frequency, or a difference between a measured real power and reactive power and a target real power and reactive power; and
- if a difference in amplitude and/or phase between the modified drive voltage and the measured voltage exceeds a predetermined threshold, further limiting the modified drive voltage to reduce the difference in amplitude and/or phase between the modified drive voltage and the measured voltage, and if the difference in amplitude and/or phase between the modified drive voltage and the measured voltage does not exceed the predetermined threshold, not further limiting the modified drive voltage, wherein the controller is configured to:
  - transform the measured voltage into a measured voltage vector representative of the measured voltage in a stationary or rotating reference frame as a measured voltage vector;
  - provide the modified drive voltage as a drive voltage vector representative of the modified drive voltage in the stationary or rotating reference frame as a drive voltage vector; and
  - compare the drive voltage vector and the measured voltage vector and determine whether there is a difference between the drive voltage vector and the measured voltage vector in the stationary or rotating reference frame that exceeds a pre-determined threshold, and if the difference exceeds the pre-determined threshold, then limit the drive voltage vector to reduce the difference between the drive voltage vector and the measured voltage vector in the stationary or rotating reference frame.

17. The controller according to claim 16, wherein the stationary or rotating reference frame is a two-dimensional reference frame.

18. The controller according to claim 16, wherein the controller is configured to:
- measure a multi-phase voltage of the AC output produced by the inverter
- determine a multi-phase drive voltage for controlling the inverter; and
- if a difference in amplitude and/or phase between a multi-phase drive voltage and a multi-phase measured voltage exceeds a pre-determined threshold, modify the multi-phase drive voltage to reduce the difference in amplitude and/or phase between the multi-phase drive voltage and a multi-phase measured voltage.

19. The controller according to claim 16, wherein the measured voltage vector and the drive voltage vector are provided by one of a Park transformation or a Clarke transformation, and the controller is further configured to:
- carry out an inverse transformation to provide a time domain drive vector voltage;
- measure a current of the AC output produced by the inverter; and
- if the measured current exceeds a predetermined threshold, limit the modified drive voltage in the time domain to reduce the current of the AC output produced by the inverter.

20. An inverter for converting a DC input to an AC output, the inverter including a controller according to claim 16.

* * * * *